United States Patent
Varadarajan et al.

(10) Patent No.: US 9,762,501 B2
(45) Date of Patent: Sep. 12, 2017

(54) SYSTEMATIC HYBRID NETWORK SCHEDULING FOR MULTIPLE TRAFFIC CLASSES WITH HOST TIMING AND PHASE CONSTRAINTS

(71) Applicant: Honeywell International Inc., Morristown, NJ (US)

(72) Inventors: Srivatsan Varadarajan, St. Louis Park, MN (US); Brendan Hall, Eden Prairie, MN (US); William Todd Smithgall, League City, TX (US); Ted Bonk, Cave Creek, AZ (US); Benjamin F. DeLay, McCordsville, IN (US)

(73) Assignee: Honeywell International Inc., Morris Plains, NJ (US)

( * ) Notice: Subject to any disclaimer, the term of this patent is extended or adjusted under 35 U.S.C. 154(b) by 29 days.

(21) Appl. No.: 14/676,486

(22) Filed: Apr. 1, 2015

(65) Prior Publication Data

US 2016/0294720 A1    Oct. 6, 2016

(51) Int. Cl.
*H04L 12/869* (2013.01)
(52) U.S. Cl.
CPC ........... *H04L 47/60* (2013.01); *H04L 47/58* (2013.01)
(58) Field of Classification Search
CPC ..................................................... H04L 47/60
See application file for complete search history.

(56) References Cited

U.S. PATENT DOCUMENTS

| | | | |
|---|---|---|---|
| 5,694,542 A | 12/1997 | Kopetz | |
| 6,330,236 B1 | 12/2001 | Ofek et al. | |
| 6,760,328 B1 | 7/2004 | Ofek | |
| 6,876,651 B1 * | 4/2005 | Grohn | H03L 7/06 370/375 |
| 6,973,033 B1 | 12/2005 | Chie et al. | |

(Continued)

FOREIGN PATENT DOCUMENTS

| | | |
|---|---|---|
| EP | 2525534 | 11/2012 |
| WO | 2009130218 | 10/2009 |

OTHER PUBLICATIONS

U.S. Patent and Trademark Office, "Office Action", "U.S. Appl. No. 14/676,474", Sep. 23, 2016, pp. 1-35, Published in: US.

(Continued)

*Primary Examiner* — Robert M Morlan
*Assistant Examiner* — Nourali Mansoury
(74) *Attorney, Agent, or Firm* — Fogg & Powers LLC

(57) ABSTRACT

Systems and methods for systematic hybrid network scheduling for multiple traffic classes with host timing and phase constraints are provided. In certain embodiments, a method of scheduling communications in a network comprises scheduling transmission of virtual links pertaining to a first traffic class on a global schedule to coordinate transmission of the virtual links pertaining to the first traffic class across all transmitting end stations on the global schedule; and scheduling transmission of each virtual link pertaining to a second traffic class on a local schedule of the respective transmitting end station from which each respective virtual link pertaining to the second traffic class is transmitted such that transmission of each virtual link pertaining to the second traffic class is coordinated only at the respective end station from which each respective virtual link pertaining to the second traffic class is transmitted.

20 Claims, 21 Drawing Sheets

(56) References Cited

U.S. PATENT DOCUMENTS

| | | | |
|---|---|---|---|
| 7,675,919 B2 | 3/2010 | Vestal | |
| 7,852,829 B2 | 12/2010 | Chao et al. | |
| 8,315,274 B2 | 11/2012 | Bibby et al. | |
| 8,503,484 B2 | 8/2013 | Bonk et al. | |
| 8,565,214 B2 | 10/2013 | Guo et al. | |
| 8,738,981 B2 | 5/2014 | Gorokhov et al. | |
| 2002/0044563 A1* | 4/2002 | Magill | H04L 12/5601 370/411 |
| 2003/0227926 A1* | 12/2003 | Ramamurthy | H04L 12/5601 370/395.42 |
| 2005/0058149 A1 | 3/2005 | Howe | |
| 2005/0117596 A1 | 6/2005 | Kopetz | |
| 2005/0220097 A1* | 10/2005 | Swami | H04L 12/5693 370/389 |
| 2005/0270975 A1* | 12/2005 | Meylan | H04L 47/14 370/229 |
| 2007/0147287 A1* | 6/2007 | Jalil | H04W 16/06 370/329 |
| 2007/0206620 A1 | 9/2007 | Cortes et al. | |
| 2008/0008116 A1* | 1/2008 | Buga | H04L 41/046 370/328 |
| 2008/0112439 A1* | 5/2008 | Vestal | H04J 3/0661 370/516 |
| 2008/0298380 A1* | 12/2008 | Rittmeyer | H04L 12/2697 370/412 |
| 2009/0323704 A1 | 12/2009 | Hall et al. | |
| 2010/0034210 A1 | 2/2010 | Wageningen et al. | |
| 2012/0250694 A1* | 10/2012 | Hall | H04L 49/501 370/400 |
| 2013/0170498 A1 | 7/2013 | Danielsson et al. | |
| 2014/0222572 A1 | 8/2014 | Ryu et al. | |
| 2016/0234714 A1 | 8/2016 | Basu Mallick et al. | |

OTHER PUBLICATIONS

Varadarajan et al., "Interference Cognizant Network Scheduling", "U.S. Appl. No. 14/676,464, filed Apr. 1, 2015", Apr. 1, 2015, pp. 1-85.

Varadarajan et al., "System and Method for Network Bandwidth, Buffers and Timing Management Using Hybrid Scheduling of Traffic With Different Priorities and Guarantees", "U.S. Appl. No. 14/676,474, filed Apr. 1, 2015", Apr. 1, 2015, pp. 1-91.

European Patent Office, "Extended European Search Report from EP Application No. 16153253.6 mailed Apr. 14, 2016", "from Foreign Counterpart f U.S. Appl. No. 14/676,486", Apr. 14, 2016, pp. 1-6, Published in: EP.

Uiwasurat et al., "Hierarchical Shaped Deficit Round-Robin Scheduling", "Global Telecommunications Conference", Nov. 28, 2005, pp. 688-693, vol. 2, Publisher: IEEE, Published in: University Park, Pennsylvania.

European Patent Office, "Extended Europan Search Report from EP Application No. 16153041.5 mailed May 20, 2016", from Foreign Counterpart of U.S. Appl. No. 14/676,464, May 20, 2016, pp. 1-9, Published in: EP.

European Patent Office, "Extended European Search from EP Application No. 16153042.3, mailed Aug. 30, 2016", "from Foreign Counterpart of U.S. Appl. No. 14/676,474", Aug. 30, 2016, pp. 1-9, Published in: EP.

"AFDX Protocol Tutorial", "AFDX/ARINC 664 Tutorial", May 1, 2005, pp. 1-49, Publisher: Condor Engineering Inc.

US Patent and Trademark Office, "Notice of Allownace", "U.S. Appl. No. 14/676,464", Dec. 12, 2016, pp. 1-10, Published in: US.

U.S. Patent and Trademark Office, "Final Office Action", "U.S. Appl. No. 14/676,474", Feb. 9, 2017, pp. 1-31.

U.S. Patent and Trademark Office, Notice of Allowance, U.S. Appl. No. 14/676,474, May 19, 2017, pp. 1-13.

\* cited by examiner

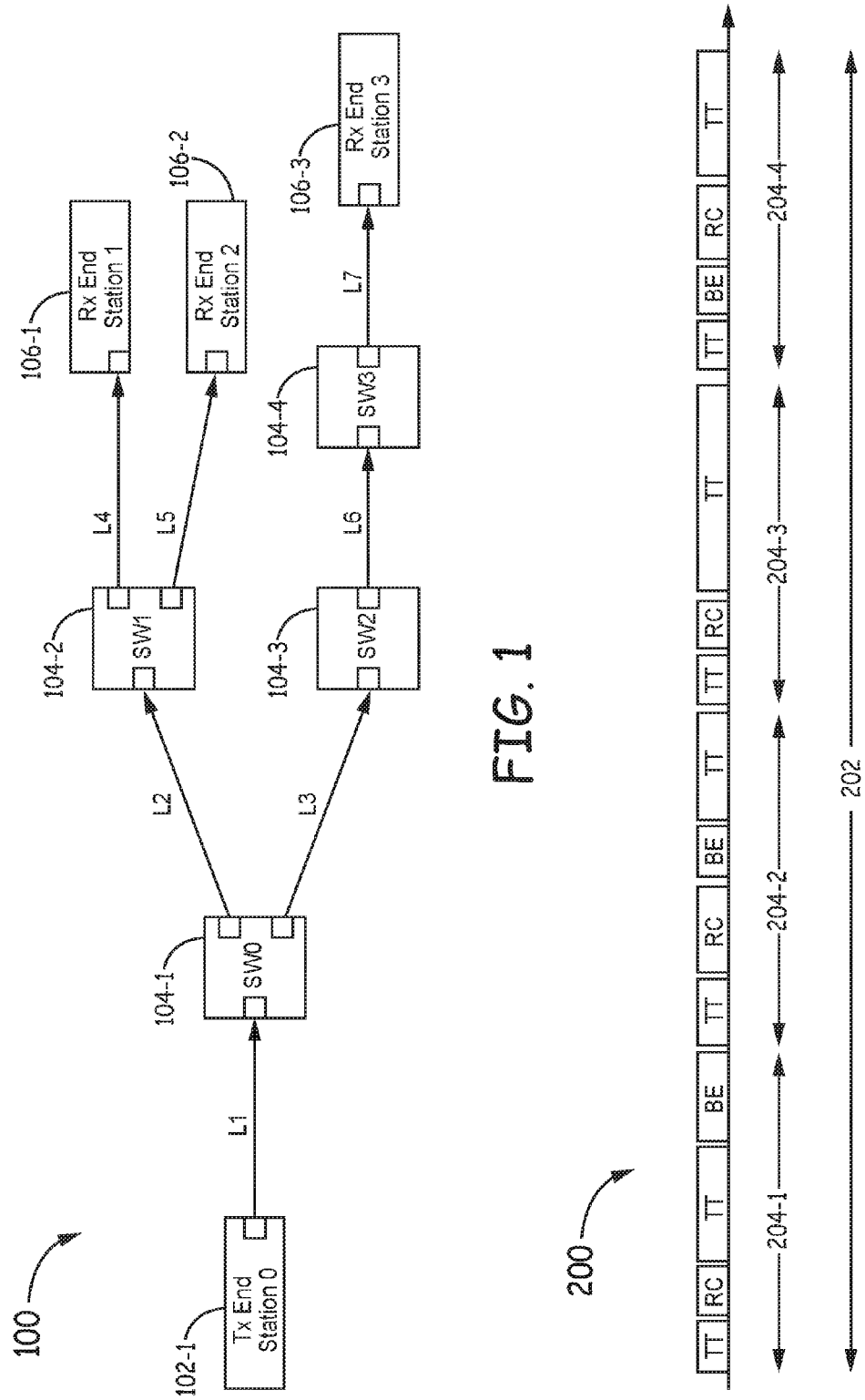

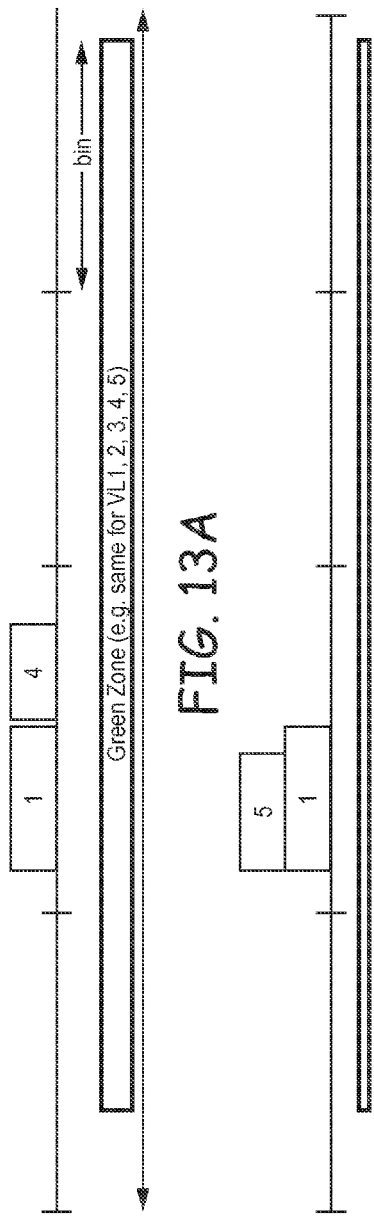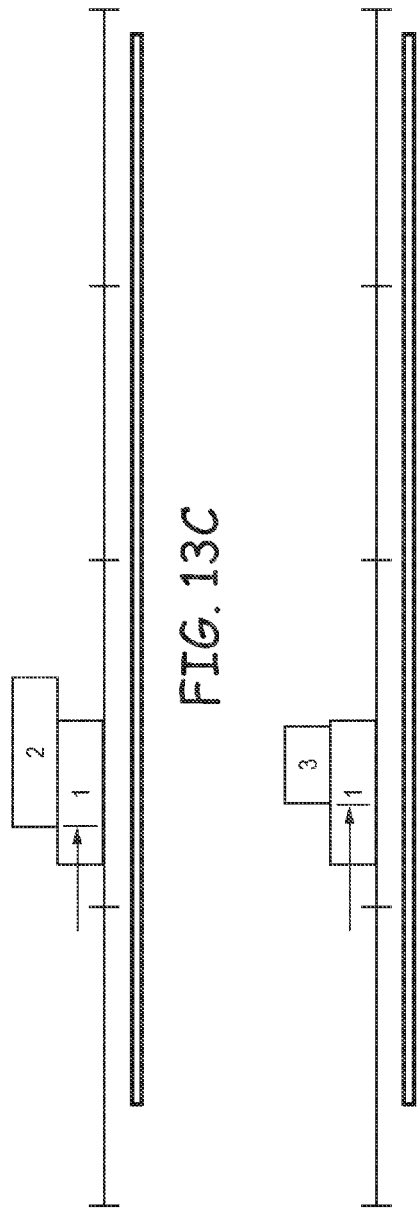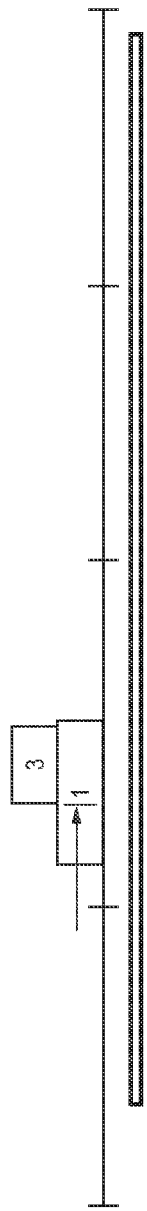
FIG. 13A
FIG. 13B
FIG. 13C
FIG. 13D

SYSTEMATIC HYBRID NETWORK SCHEDULING FOR MULTIPLE TRAFFIC CLASSES WITH HOST TIMING AND PHASE CONSTRAINTS

STATEMENT REGARDING FEDERALLY SPONSORED RESEARCH OR DEVELOPMENT

This invention was made with Government support under contract No. NNJ06TA25C awarded by NASA Johnson Space Center. The Government may have certain rights in the invention.

BACKGROUND

Some networks, such as Time-Triggered Ethernet networks, support explicit scheduling of messages for transmission over the network. However, conventional tools for scheduling the messages do not sufficiently leverage capabilities of the underlying network hardware to improve performance of the network with respect to criteria such as end-to-end delay, jitter, etc.

SUMMARY

Systems and methods for systematic hybrid network scheduling for multiple traffic classes with host timing and phase constraints are provided. In certain embodiments, a method of scheduling communications in a network comprises scheduling transmission of virtual links pertaining to a first traffic class on a global schedule to coordinate transmission of the virtual links pertaining to the first traffic class across all transmitting end stations on the global schedule; and scheduling transmission of each virtual link pertaining to a second traffic class on a local schedule of the respective transmitting end station from which each respective virtual link pertaining to the second traffic class is transmitted such that transmission of each virtual link pertaining to the second traffic class is coordinated only at the respective end station from which each respective virtual link pertaining to the second traffic class is transmitted.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 is a block diagram of one embodiment of an exemplary network.

FIG. 2 depicts an exemplary timeline of messages in a communication period.

FIGS. 13A-13D illustrate various manners of scheduling TT virtual links in a common bin.

Figure 3:
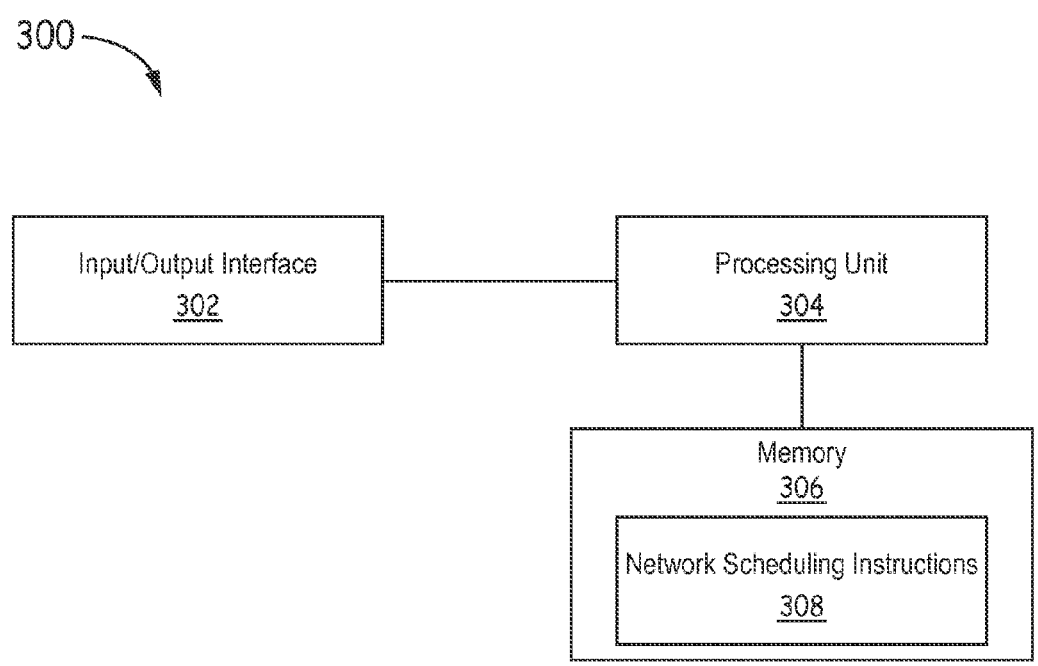
FIG. 3 is a block diagram of one embodiment of an exemplary network scheduling tool.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below enable a novel network scheduling tool to more efficiently utilize the features and capabilities of the underlying network hardware, such as fault-tolerance capability, to provide improved network performance with respect to such measures as latency, interference, etc. For example, the embodiments described below enable improved slot time allocation, a new class of traffic, and improved buffer management. Thus, when implemented by the underlying the hardware, the schedule and configuration parameters generated by embodiments of the network scheduling tool described herein result in improved performance of the network. The various features of the network scheduling tool described herein can be used together or individually depending on the features and capabilities of the underlying network hardware. Thus, whereas many of the features can be implemented as interrelated features of the network scheduling tool, they have been described separately, for purposes of explanation.

Figure 4A:
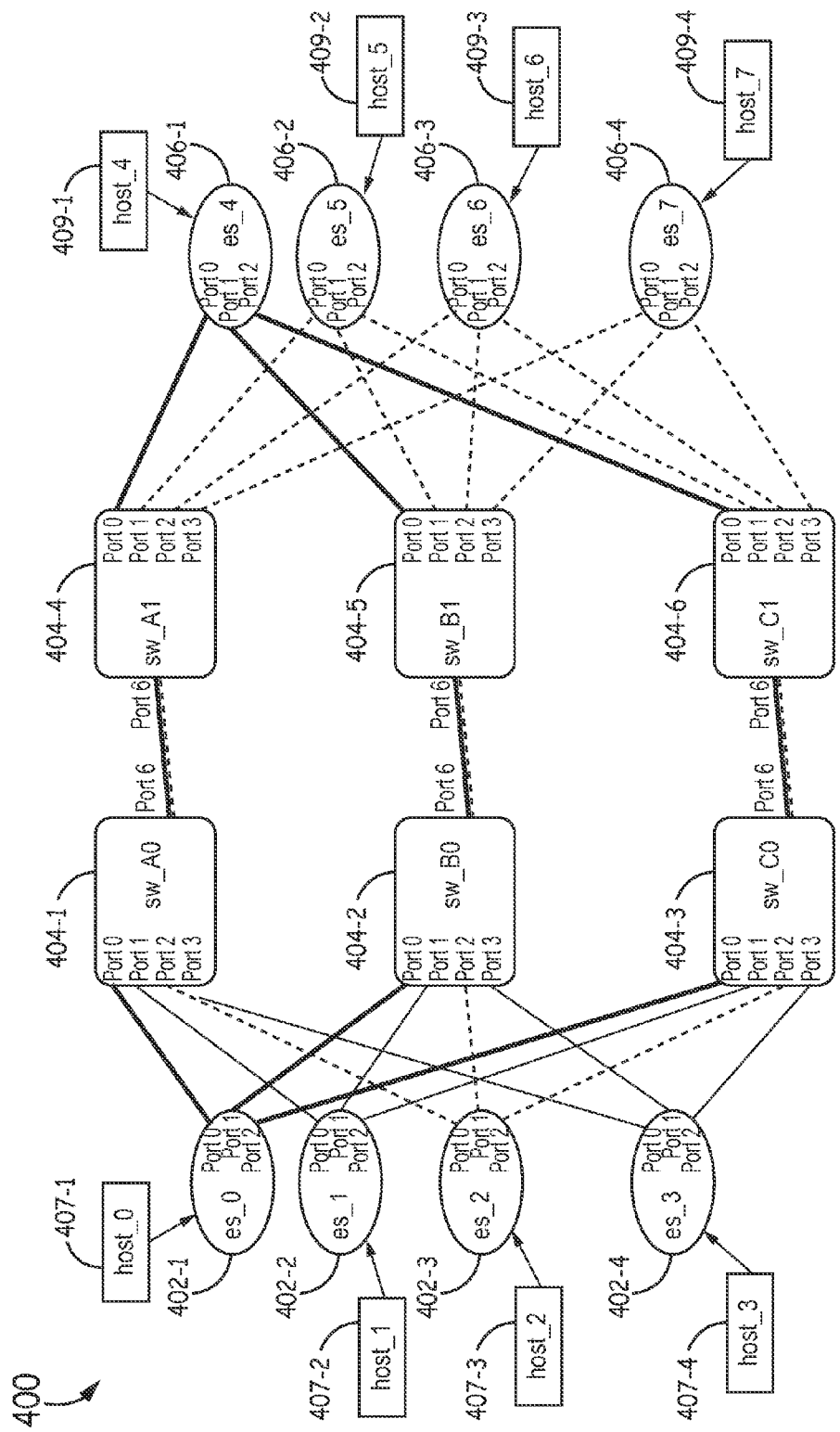
FIG. 4A is a block diagram of one embodiment of an exemplary network having symmetric network planes.
Figure 4B:
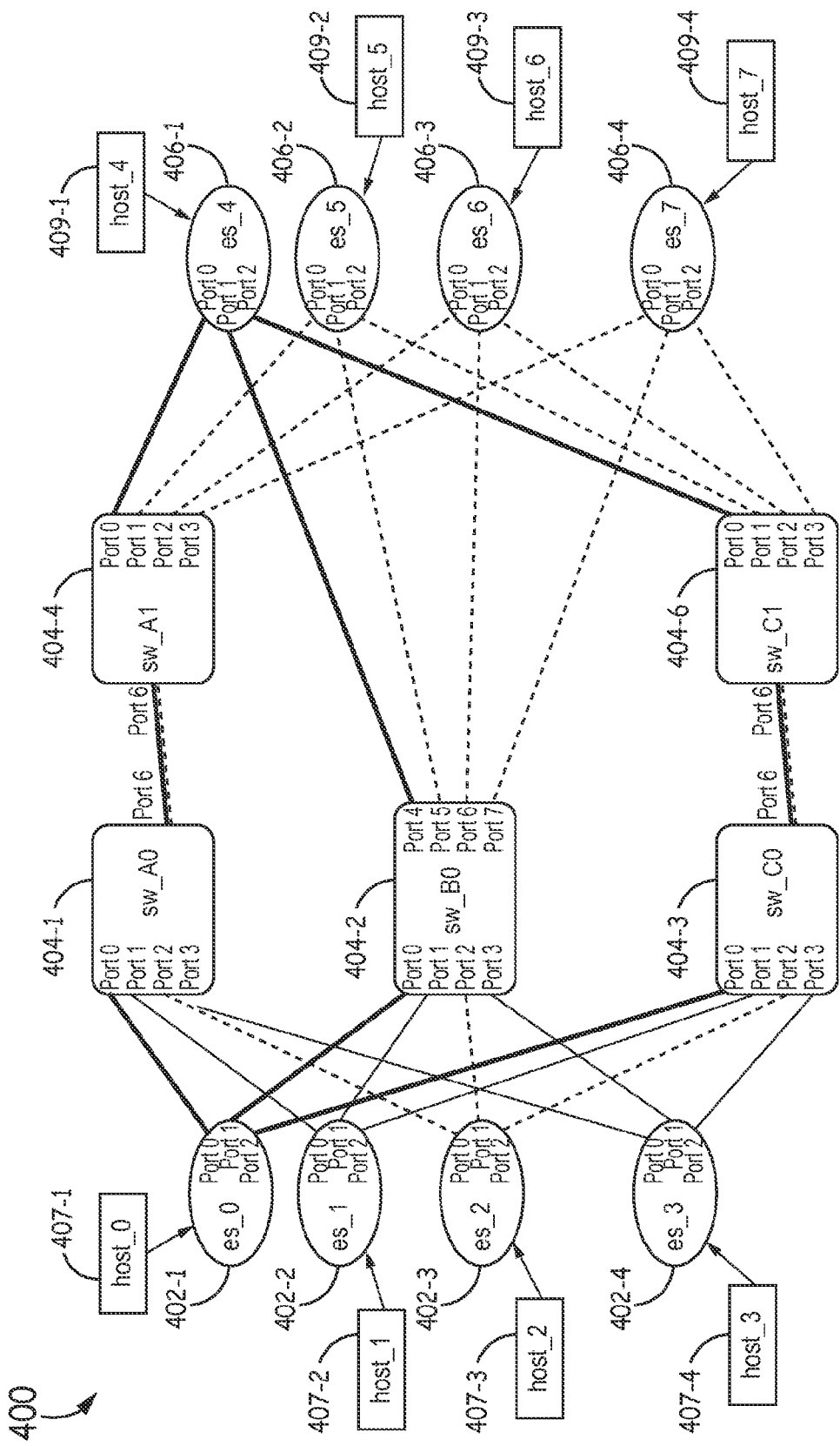
FIG. 4B is a block diagram of one embodiment of an exemplary network having asymmetric network planes.

FIG. 1 is a block diagram of one embodiment of an exemplary network 100. Network 100 includes a plurality of end stations 102 and 106 (also referred to herein as network interface cards) and a plurality of switches 104. As used herein, both switches and end stations can be referred to as nodes. Node 102 is designated as a transmission node and nodes 106-1 . . . 106-3 are designated as reception nodes to which a transmitted message from node 102 is directed. As used herein, a 'virtual link' defines traffic flow from a single transmitting node 102 to one or more reception nodes 106. For example, a virtual link may refer to a virtual link as defined in ARINC 664 part 7. In addition, as used herein, a 'network plane' refers to a disjoint or distinct path from a single transmitting port in a transmitting node 102 to the one or more reception nodes 106 of the virtual link. Since all paths in FIG. 1 from the transmitting node 102 to the reception nodes 106 include switch 104-1, FIG. 1 depicts only a single network plane. Although FIG. 1 only depicts a single network plane for purposes of explanation, it is to be understood that in other embodiments, multiple network planes can be included in network 100 to provide data path redundancy, for example, such as described below with respect to FIGS. 4A and 4B. In particular, FIG. 4A depicts an exemplary network having symmetric network planes, whereas FIG. 4B depicts an exemplary network having asymmetric network planes. Additionally, FIGS. 4A and 4B depict a Virtual Link centric view of the exemplary network, whereas FIG. 21 described below depicts a buffer centric view of an exemplary network plane.

Network 100 can be implemented using suitable hardware and protocols which can be configured to support one or more of the functions described herein. For example, for purposes of explanation, the embodiments described herein are implemented using the Time Triggered Ethernet protocol and compatible hardware as defined in the SAE AS6802 standard. However, it is to be understood that other hardware and protocols can be used in other embodiments. For example, other exemplary network implementations include, but are not limited to, Ethernet based networks including Avionics Full-Duplex Switched (AFDX) Ethernet defined in the ARINC 664 Part 7 standard and non-Ethernet based store and forward networks. As used herein, Ethernet refers to the family of protocols defined in the IEEE 802.3 standard. In addition, it is to be understood that in some embodiments, multiple network protocols can be used together. For example, in some embodiments, a Network Scheduling and Configuration Tool (referred to herein as NST) is configured to enable scheduling a TTEthernet schedule on top of an already existing AFDX schedule to thereby integrate or combine the schedules.

Figure 18:
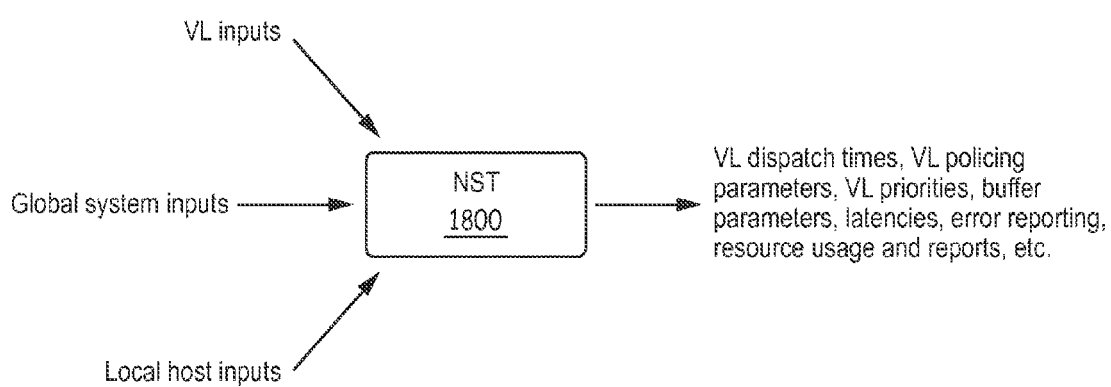
FIG. 18 depicts exemplary inputs and outputs of exemplary embodiments of a Network Scheduling Tool.

The NST is used to schedule transmission of messages (also referred to herein as frames) through the network 100 as well as determine other configuration parameters for operation of the network 100. The NST need not be one of the end stations 102, 106 or switches 104 in network 100. FIG. 18 depicts exemplary inputs for use by embodiments of the NST 1800 and exemplary schedule and configuration parameters output by embodiments of the NST 1800. In particular, the exemplary inputs include virtual link (VL) inputs, global system inputs, and local host inputs. The VL inputs for each virtual link can include the virtual link identification number, the source network interface card (NIC), the set of reception nodes, routing information, payload size, traffic class, transmit rate, and schedule type (e.g. fast pass or normal pass). Details regarding the exemplary VL inputs are described in more detail below.

The global system inputs can include information regarding synchronization flows between timing masters and compression masters as defined in SAE AS602, and system configuration constants (e.g. precision constant, inter-frame gap (IFG) etc.). Details regarding the exemplary global system inputs are described in more detail below. The local host inputs can include producer or transmitting node write frame rate, producer time frame offset definition, consumer or reception node read frame rate, consumer time frame offset definition, producer buffer and consumer buffer models (e.g. single transmit buffer, VL queue, direct memory access (DMA), First-in-First-out, etc.) Details regarding exemplary local host inputs are described in more detail below.

The exemplary output scheduling and configuration parameters can include VL dispatch times, VL policing parameters, VL priorities, buffer parameters, latencies, error reporting, resource usage and reports, etc. For example, the NST 1800 can calculate the schedule for VL dispatch times and arrival windows based on message rates and timing constraints. Additionally, the NST 1800 can set bandwidth allocation gap (BAG) for bandwidth policing per ARINC 664, policing (jitter) values, assign VL priorities based on rates, determine buffer types and size allocations in end stations and switches, determine resource usage and reports (such as, but not limited to, link utilizations, time slots spares efficiency, buffer utilization, etc.), and provide error and warning reports (such as, but not limited to schedulability, buffer over runs, etc.) In addition, the NST 1800 can determine end-to-end data latencies and jitter between end stations and provide timing reports for a global timeline and a local timeline for every switch and end station dispatch port. Additional details regarding the schedule and configuration parameters output by the NST 1800 are described in more detail below.

An exemplary NST is shown in FIG. 3. The NST 300 includes an input/output interface 302, a processing unit 304, and a memory 306. Network scheduling instructions 308 are stored in the memory 306. The processing unit 304 includes or functions with software programs, firmware or other computer readable instructions (e.g. network scheduling instructions 308) for carrying out various methods, process tasks, calculations, and control functions, used in performing the functions described herein, such as scheduling the multiple classes of frames.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

By executing the network scheduling instructions 308, the processing unit 304 computes network configuration and scheduling tables which are output via the input/output interface 302. The network scheduling instructions 304 are configured to cause the processing unit 304 to implement some or all of the techniques described herein to compute the configuration and scheduling tables. The configuration and scheduling tables can be loaded into the various nodes (e.g. end stations and switches) of the network for managing the frames that flow through the network. Hence, the NST 300 need not be implemented as a node in the network.

For example, the configuration and scheduling tables allow both Rate Constrained (RC) and Time Triggered (TT) scheduling parameters of the TTEthernet and ARINC 664 part 7 protocols, discussed in more detail below, to be specified for any virtual link ID regardless of its arrival class. That is, a controlled traffic frame arriving at an input port of a switch, for example, may be transmitted from a dispatch/output port of the switch using the TT scheduling protocol on some output ports and the RC scheduling protocol on other ports, regardless of how the arriving frame was classified on arrival at the input port. In other words, the frame may arrive at the input port as a TT or RC frame. Additionally, the pattern used to determine the class of an arriving frame is configurable. For example, the same frame may be classified differently in different network units. That is, the same frame may be classified differently at a Tx ES than it is at a switch or a receiving end station (Rx ES). Indeed, different physical links in a virtual link routing tree can be configured to handle the same frame using different traffic classes. The NST configuration may ensure a desired performance for the TT and RC classes for critical traffic. In addition the NST 300 accomodates Best-Effort (BE) traffic, which typically is used for non-critical traffic, by allowing a network medium to be shared with safety-relevant traffic flows. The traffic classes supported by the NST are discussed in more detail below.

Multi Rate, Multi Criticality Traffic Scheduling

The NST 300 supports multiple classes of messages. In some embodiments, the traffic class for each respective message or frame is derived from or is a function of the addressing scheme. That is, the traffic class can be based on the VL identification (ID) or destination address. In some embodiments, the NST 300 supports the simultaneous scheduling and configuration of a TT message class, a RC message class, and a BE message class that are implemented by the underlying network hardware. TT messages are sent over the network 100 at predefined times and have a higher priority than RC and BE message types. The occurrence, temporal delay and precision of TT messages are predefined and guaranteed. The messages have as little delay on the network as possible and their temporal precision is as accurate as needed based on system configuration. For example, TT messages are tightly coupled to a global timeline or schedule. As used herein, the global timeline refers to a system wide clock or notion of time whereas a local timeline refers to the local time maintained by each node. Thus, the dispatch of TT frames, which are tightly coupled, are tied to the global timeline through each transmitting node and switch. Additionally, as used herein, the term 'tightly coupled' means that the dispatch times for the transmitting node and switches between the transmitting node and reception nodes are tied to a global timeline. Additionally, it is to be understood that the terms 'timeline' and 'schedule' can be used interchangeably herein.

RC messages can be used for applications with less strict determinism and real-time requirements than TT messages. RC messages are guaranteed bandwidth that is predefined for each application with delays and temporal deviations that have pre-defined limits. Asynchronous traffic falls within this class. The bandwidth, i.e. payload bytes per period/rate, is guaranteed with a bounded delay/latency to arrive at the receiver and traffic is not tightly coupled to the global time line. Thus, in contrast to TT messages, the dispatch times of RC frames, which are not tightly coupled, are not tied to the global timeline but have a bounded window for delivery of the frame to the reception nodes.

BE messages are transported through the network according to conventional Ethernet policy. That is, BE messages are not guaranteed bandwidth, transmit times, limits on maximum delay, or whether the BE messages arrive at the receiver. Essentially, BE messages use the remaining bandwidth of the network after accounting for TT and RC messages and have lower priority than the other two classes of messages.

An exemplary timeline 200 of messages in a communication period 202 is shown in FIG. 2. It is to be understood that the timeline 200 is provided by way of example only. As can be seen in FIG. 2, the communication period 202 is comprised of four base periods 204-1 . . . 204-4. As can be seen in FIG. 2, exemplary base period 204-3 does not contain any BE messages as the entire base period is occupied by TT and RC messages. Thus, there is no available bandwidth in base period 204-3 for BE messages as the BE messages use the remaining bandwidth after transmitting the TT and RC messages In some embodiments, the RC messages (also referred to herein as RC frames) satisfy the ARINC specification 664 part 7. The RC frames are queued at dispatch ports (e.g. output ports) in transmitting end stations (TxES) (e.g. node 102) and/or in switches (104-1 . . . 104-4). The RC frames are transmitted according to a priority found in a configuration table computed by the NST 300. In some embodiments, up to eight priority levels are supported by the NST 300. The eight priority levels used in this example are labelled herein as RC7, RC6, RC5, RC4, RC3, RC2, RC1, and RC0. RC7 is the highest priority and RC0 is the lowest priority. For example, in some embodiments, RC7 is used for Synchronization Traffic and is the highest priority in the system (e.g. higher than a priority for TT messages, RC messages, and BE messages). Synchronization frames are used to communicate a global time base to the nodes of the network. The scheduling and impact of synchronization frames are discussed in more detail below.

RC frames may be policed on arrival at input ports in a switch. For example, the frames can be policed to enforce either rate control in packets per second or bandwidth enforcement in bytes per second. For example, in some embodiments, a token-bucket configured with period and jitter bounds is used. Token-buckets are known to one of skill in the art and, thus, are not described in more detail herein. In some embodiments, the switches are configured to support a fixed number of policing accounts (e.g. each virtual link being policed is a policing account). For example, in implementations involving AFDX, each virtual link is monitored at an input port to determine if the number of frames per period complies with the BAG.

In some embodiments, the RC frames are redundantly transmitted over 2 (or 3) networks with a redundancy management protocol applied in each receiving end system. In some embodiments, the Network Scheduling Tool (NST) is configured to determine the maximum arrival skew between the redundant copies of a frame as described in more detail below. In addition, in some embodiments, multicast routing is statically configured by a bit vector in a configuration table which identifies the switch output ports at which a copy of the frame is to be enqueued for transmission.

The TT messages (also referred to herein as TT frames) are transmitted with a period and offset found in a schedule configuration table with respect to a global timeline. In some embodiments, multiple configurable periods having different respective values can be supported. For example, in some embodiments, up to 8 different periods (rates) for TT messages are supported. In such embodiments, the specific value for each of the 8 periods is configurable. Alternatively, the specific values for more than 8 periods may also be configurable. In some exemplary embodiments, a schedule table entry can take the form of "with period P, at offset O, if there is a TT frame with VL ID X in the frame buffer memory, then begin transmitting it out of physical ports P0, P1, P2". In the example schedule table form, P, O, X, P0, P1, and P2 are variable values set for each entry. In addition, the VL ID is a virtual link ID. The schedule table entries can be configured at the Tx ES dispatch (output) ports (e.g. output ports of node 102) and/or at the switch dispatch (output) ports (e.g. output ports of switches 104-1 . . . 104-4). Thus, each schedule table entry contains dispatch times for the corresponding virtual link.

TT frames have higher priority than BE messages and all RC priorities (RC6, RC5, . . . , RC0) except for RC7. That is, TT frames are lower priority than RC7 which is designated explicitly for Synchronization flows which are used for establishing the global time base needed by the TT class of traffic. In some embodiments, a TT frame may be blocked by up to one Ethernet frame transmission time (also referred to herein as Shuffle Time) if the transmission window starts while another frame is already in transmission, unless the communication media has been reserved, e.g. a preceding reserve media window appears in the scheduling table as discussed in more detail below. The reserve media essentially blocks transmission of any other "unscheduled" frames by reserving time before the configured scheduled dispatch time of the respective TT frame. Thus, the shuffle time or shuffle penalty is an artifact of enabling or disabling the reserve media option. That is, if the reserve media option is enabled then there is no shuffle penalty. If the reserve media option is disabled then a shuffle penalty is taken into account.

In some embodiments, TT frames are policed (e.g. policies are enforced) on arrival of the TT frames at a switch by a TT policing window that is configured at an input port of the switch. In some embodiments, the TT frames can be redundantly transmitted over 2 (or 3) networks planes with a TT redundancy management protocol applied in each receiving end system. Multi-cast routing for TT frames, as well as RC frames, is statically configured by specifying, for each scheduling window, which set of physical switch ports are to transmit a given TT frame during that window. Different transmission windows may be defined for different switch output ports for the same multi-cast TT frame. A configured amount of frame buffer memory in each unit (e.g. switch) is statically reserved for all TT frames flowing through that respective unit. As with the RC frames discussed above, the NST ensures, based on computed schedules and latencies, that the available buffers in the switches and end stations are not exceeded during operation.

The BE messages or frames comply with the Institute of Electrical and Electronics Engineers (IEEE) 802.3 group of standard which define Ethernet. BE frames are queued at each unit (e.g. switch or transmitting node) in a First-In First-Out (FIFO) manner. In addition, BE frames have lower priority than Synchronization, TT or RC frames. Unlike TT and RC frames, BE frames are not transmitted redundantly in this example. Additionally, Ethernet pause frames, which temporarily halt transmission of a frame from a node, apply only to BE frames in this example. In the embodiment of FIG. 1, switches 104 have two BE routing tables. Each BE routing frame can be either statically configured with a multi-cast routing table or set to dynamically learn unicast routings by remembering Ethernet source addresses in arriving BE frames. BE broadcast frames are supported by switches 104 in FIG. 1 by enabling BE broadcast frames for each individual physical input port of each respective switch.

An example network topology depicting traffic flow as virtual links is shown in FIGS. 4A and 4B. The network 400 in FIG. 4A, for example, includes a plurality of Tx ES 402-1 . . . 402-4 (also labelled as es_0, es_1, es_2, es_3), a plurality of switches 404-1 . . . 404-6, and a plurality of Rx ES 406-1 . . . 406-4 (also labelled as es_4, es_5, es_6, and es_7). Each of the Tx ES 402 is coupled to or integrated with a respective producer host 407. Similarly, each of the Rx ES 406 is coupled to or integrated with a consumer host 409. As shown in Figure s 4A and 4B, the network 400 includes 3 network planes as three switches 404-1, 404-2, and 404-3 are coupled directly to the Tx ES 402-1 . . . 402-4. Each of the Tx ES 402 and Rx ES 406 can be implemented as high-integrity or standard integrity network interface cards (NICs). Each switch between a Tx ES and the associated Rx ES for a given network plane is referred to as a hop. For example, the switch 404-1 is a first hop and switch 404-4 is a second hop for the respective network plane. If another switch were connected to the switch 404-4, the additional switch would be referred to as a third hop, and so on. For example, in FIG. 1, switch 104-1 is a first hop, switch 104-3 is a second hop and switch 104-4 is a third hop.

In the example shown in FIG. 4, Tx ES 402-2 and Tx ES 402-4 are not depicted as transmitting frames for ease of explanation. However, Tx ES 402-1 is a producer host for a first virtual link and Tx ES 402-3 is a producer host for a second virtual link. Rx ES 406-1 is a consumer host for the first virtual link and Rx ES 406-2, 406-3, and 406-4 are consumer hosts for the second virtual link. Thus, the first virtual link is implemented as a redundant uni-cast link whereas the second virtual link is implemented as a redundant multi-cast link. In this embodiment, synchronization frames, TT frames & RC frames are considered critical traffic frames which can be unicast, multicast, or broadcast and can be specified as virtual links. BE frames can be unicast or broadcast in this example. However, BE frames are not considered critical and not specified as virtual links.

Scheduled Rate Constrained Traffic Class

In addition to the traffic classes discussed above, a scheduled rate constrained (SCHRC) "logical" traffic class is created by the NST 300 using TT and RC mechanisms supported by the network hardware, in some embodiments. That is, in calculating the schedule and configuration tables, the NST 300 accounts for SCHRC frames. Handling or scheduling of an SCHRC frame can be considered a hybrid between handling a TT frame and handling a pure RC frame. In particular, whereas TT frames are scheduled on a global timeline, SCHRC frames are scheduled on a local timeline of the respective Tx ES, where the local timeline need not be tied to the global timeline. For example, the same rates/period allowed for TT traffic schedules are also allowed for SCHRC traffic schedules. Additionally, SCHRC VL frames mimic TT VL frames when being scheduled and dispatched from a Tx ES. That is, the SCHRC frames have the same priority as a TT frame when scheduled for dispatch from a Tx ES. However, SCHRC VL frames flow through the 1st, 2nd, 3rd, etc. hop switches to the corresponding Rx ES as an RC frame with lower priority than a TT frame.

In some embodiments, the SCHRC frames have a higher priority than pure RC frames. In other embodiments, the SCHRC frames have the same or lower priority than a pure RC frame. NST, by allowing the selective configuration of such priorities, by allowing improved control and optimization of network performance as discussed below. The relative priority of the SCHRC frames as compared to the pure RC frames can be configured by a system integrator. Thus, 2 or more SCHRC frames can be dispatched at the same time from different transmitting end stations, but not from a single transmitting end station, because the SCHRC frames are scheduled on a local timeline. In contrast, TT frames are scheduled on a global timeline and, thus, only 1 TT frame can be dispatched at a given point in time on the global timeline.

For example, since 8 RC priorities are available in this example, the RC7 priority is reserved for synchronization frames and the RC6 priority is reserved for TT frames. In some embodiments, the next set of RC priorities is reserved for SCHRC frames. For example, RC5 and RC4 priorities can be reserved for SCHRC frames with the remaining priorities (e.g. RC3, RC2, RC1, and RC0) available for pure RC traffic. A system integrator can decide the number of priorities and their associations with traffic classes a priori. The selective assignment of priorities by the NST 300, as described in more detail below, enables more efficient scheduling of traffic at the system level in order to meet latency and jitter requirements of the date flows.

Configuration Paradigms

The various configuration paradigms described herein provide varying levels of control over system parameters, such as jitter and end-to-end latency. For example, arbitrary rates/periods are allowed for RC virtual links (VLs). In this embodiment, 8 rates/periods are allowed. However, it is to be understood that other numbers of periods (e.g. 2, 4, 6, etc.) can be allowed in other embodiments based on the underlying hardware. RC VLs cannot use the highest priorities (e.g. RC7 and RC6) since these are reserved for use by synchronization traffic and TT traffic. RC VLs are not scheduled on the global time line and, thus, RC VLs are unscheduled. The NST 300 configures the switch routing tables for routing each RC VL from an input port to one or more output/dispatch ports at every switch between the Tx ES and the Rx ESs, for one or more network planes, using a shortest path algorithm. For example, in some embodiments, a Floyd-Warshall algorithm known to one of skill in the art is used.

In some embodiments, the routing tables created by the NST 300 configure only the first switch hop to enforce RC BAG/Jitter policies on arrival at the input port. Enforcement of the BAG/jitter policies is disabled at subsequent second hop switches, third hop switches, etc., in such embodiments. The NST 300 can disable BAG/jitter policies for subsequent switches based on knowledge that the switches are high integrity and fail-passive in some embodiments. Hence, the protection provided by the first hop is sufficient for such implementations.

Disabling enforcement of BAG/jitter policing at subsequent switches, via the routing tables created by the NST 300, also saves the number of BAG/Jitter policing accounts needed since only a limited number of BAG policing accounts are available at every switch, in some embodiments. Additionally, jitter is the least from the Tx ES to the first hop switch and starts diverging at the second hop switch, third hop switch and so on. Thus, it is not necessary to specify increasing divergence at subsequent hops especially in embodiments where each switch includes a high integrity NIC which fail-silent with respect to babbling idiot faults or increasing rate/bandwidth faults. That is, the switches are guaranteed to not introduce those types of faults for which BAG/jitter policing is typically used.

In a first configuration option for TT virtual links, the NST 300 calculates a configuration and scheduling table without a shuffle penalty on input and output ports. A shuffle penalty (also referred to as shuffle time) is the amount of time that a frame can be blocked or delayed from its transmission time due to another frame already in transmission. A shuffle penalty may also be used to widen the temporal acceptance policing window used as part of the frame reception processing. In this configuration option, a reserve media option is used at the Tx ES 102 and at each of the switches 104-1 . . . 104-4. The reserve media option reserves a period of time prior to the scheduled transmission time of the TT frame such that other frames are not transmitted during the reserved period of time. In this way, the TT frame does not have a conflict with another frame at the scheduled transmission time.

Thus, in the first configuration option, the TT virtual link is configured as a TT class of traffic at the dispatch port of the Tx ES 102 with the reserve media option enabled and a shuffle time penalty not assumed. Similarly, at each of the switches 104-1 . . . 104-4, the TT virtual link is configured as a TT class of traffic at the dispatch port of the switches 104 with the reserve media option enabled and a shuffle time penalty not assumed. Thus, the shuffle penalty is not assumed at each of the switches 104. At the input ports of the first switch hop 104-1, the TT virtual link is configured as a TT class of traffic and an arrival policing window (e.g. earliest time of arrival and latest time of arrival) is enforced.

At the input ports of the subsequent switch hops (e.g. switch 104-2, 104-3, and 104-4), the TT virtual link is configured as RC traffic having the highest available RC class priority (e.g. RC6). The subsequent switches 104-2, 104-3, and 104-4 are not configured to enforce BAG or jitter policies. At the input ports of the corresponding Rx ES (e.g. Rx ES 106-1 . . . 106-3), the TT virtual link is configured as a TT class of traffic and each corresponding Rx ES is configured to perform TT redundancy management.

In a second configuration option for TT virtual links, the NST 300 calculates a configuration and scheduling table with selective use of a shuffle penalty. For example, in the second configuration option, the shuffle penalty is not assumed at the Tx ES 102, but assumed at each of the switches 104. In particular, at the dispatch or output ports of the Tx ES 102, the TT virtual link is configured as a TT class of traffic, the reserve media option is enabled, and the shuffle penalty is not assumed.

At the input port of the first hop switch 104-1, the TT virtual link is configured as a TT class of traffic on arrival and arrival window policing is enabled. At the input ports of the subsequent hop switches (e.g. switch 104-2, 104-3, 104-4), the TT virtual link is configured as an RC class of traffic having the highest available RC priority (e.g. RC6) upon arrival. BAG and jitter policing is disabled on the input ports of the subsequent switches. At the output or dispatch ports of each of the switches 104-1 . . . 104-4, the TT virtual link is configured as an RC class of traffic having the highest priority (e.g. RC6) at dispatch. This is equivalent to a TT class of traffic having the reserve media option disabled to allow the shuffle time penalty at all of the switches. At the input port of each of the corresponding Rx ES 106, the TT virtual link is configured as a TT class of traffic on arrival and TT redundancy management is enabled.

In a third configuration option for TT virtual links, the shuffle penalty is not assumed at the Tx ES 102 and at the first hop switch 104-1, but enabled at the subsequent switches. In particular, at the dispatch or output ports of the Tx ES 102, the TT virtual link is configured as a TT class of traffic, the reserve media option is enabled, and the shuffle penalty is not assumed. At the input port of the first hop switch 104-1, the TT virtual link is configured as a TT class of traffic on arrival and arrival window policing is enabled. At the output ports of the first hop switch 104-1, the TT virtual link is configured as TT traffic at dispatch and the schedule table is configured for dispatch times with the reserve media option enabled and the shuffle penalty not assumed.

At the input ports of the subsequent switches (104-2, 104-3, 104-4), the TT virtual link is configured on arrival as an RC class of traffic having the highest available RC priority and BAG/jitter policing is disabled. At the output ports of the subsequent switches, the TT virtual link is configured as an RC class of traffic having the highest priority (e.g. RC6) at dispatch. This is equivalent to a TT class of traffic having the reserve media option disabled to allow the shuffle time penalty at all of the switches. At the input port of each of the corresponding Rx ES 106, the TT virtual link is configured as a TT class of traffic on arrival and TT redundancy management is enabled.

In a fourth configuration option for TT virtual links, the shuffle penalty assumed at each of the units in the network plane. For example, at dispatch ports of the Tx ES 102 the TT virtual link is configured as a TT class of traffic at dispatch and the schedule table is configured for dispatch times with the reserve media option disabled to allow for shuffle time penalty at the Tx ES 102. At the input port of the first hop switch 104-1, the TT virtual link is configured on arrival as a TT traffic class and arrival window policing is enforced. At the input ports of the subsequent hop switches (104-2, 104-3, 104-4), the TT virtual link is configured as an RC class of traffic having the highest available RC priority and BAG/jitter policing is disabled.

At the output ports of each of the switches 104, the TT virtual link is configured at dispatch as an RC class of traffic having the highest available RC priority. This is equivalent to a TT class at dispatch with the reserve media option disabled to enable the shuffle time penalty at the respective switch. At the input port of each of the corresponding Rx ES 106, the TT virtual link is configured as a TT class of traffic on arrival and TT redundancy management is enabled.

It should be noted that, in the examples above, only the fixed number (e.g. 8) of rates/periods or schedules of the network are allowed for the TT class of traffic. Additionally, in the exemplary configuration options discussed above, the TT virtual links are configured as a TT class on dispatch at the output port in the Tx ES 102 and on arrival at the input ports of the corresponding Rx ES 106. However, the NST 300 uses a combination of TT class and RC class classification for the TT virtual link in the underlying hardware of the input and output ports of the switches 104 depending on which of the above configuration options is selected. In some embodiments, a minimum number of scheduling tables at the hardware is updated as needed to implement the selected configuration options in order to make the system wide configuration less brittle and more robust with respect to tying the dispatches to a global time line.

In particular, in some of the configuration options, the TT virtual links are classified as an RC class with the highest available RC priority at the input or output ports of one or more of the switches 104. Since the TT virtual links use RC message class with priority RC6, the RC6 priority is not available for regular or pure RC virtual links. Furthermore, since the highest RC class (RC7 in this example) is reserved for synchronization traffic, the highest available RC class for the TT virtual links is RC6.

In addition, as discussed above, the reserve media option is selectively used to assume/not assume the shuffle penalty at the Tx ES 102 and/or the switches 104. The TT arrival window policing is also enforced only at the first hop switch 104-1 in the options discussed above. The arrival window policing is disabled at the subsequent switches 104 because the switches 104 are implemented as high integrity and fail-passive switches in the above examples. However, the arrival window policing could be enforced at one or more of the subsequent hop switches 104-2, 104-3, 104-4 in other embodiments. Also, the redundancy management enforcement mechanism is configured at the corresponding Rx ES 106 in the above examples because the Rx ES 106 and the Tx ES 102 can all be implemented as either a simplex (standard integrity) or high-integrity end station in some embodiments.

Finally, the NST 300 configures the switch routing tables for routing each TT VL from an input port to one or more output/dispatch ports at every switch between the Tx ES and the Rx ESs, for one or more network planes, using a statically configured path. That is, the same path is used for each frame of the same VL. In some embodiments, the statically configured path is determined using a shortest path algorithm or based on the path having the fewest number of hops. For example, in some embodiments, a Floyd-Warshall algorithm known to one of skill in the art is used.

Configuration options similar to those discussed above for the TT virtual links with respect to the shuffle penalty and reserve media are also available for the Scheduled RC (SCHRC) class of traffic. However, SCHRC frames are locally scheduled as opposed to being globally scheduled like TT frames. In other words, while the TT class is scheduled on a single global timeline for the network, SCHRC frames are scheduled only local to the local timeline of the respective Tx ES. Thus, other frames (e.g. TT, SCHRC, RC) transmitted from other Tx ESs can be scheduled to be transmitted at the same point in time with respect to a global timeline when the respective SCHRC frame is scheduled from its own Tx ES. As a result, the SCHRC frame is only guaranteed an amount time to be transmitted from its own Tx ES without interference from other frames also scheduled to be transmitted from its own Tx ES. For example, in FIG. 1, a SCHRC frame transmitted from Tx ES 102 is only guaranteed a transmission time slot with respect to other synchronization frames, TT frames, SCHRC frames, or unscheduled pure RC frames being transmitted from the same Tx ES 102.

In one exemplary embodiment, an SCHRC frame output from Tx ES 102 in FIG. 1 is output as a TT class and the schedule table is configured for dispatch times with or without the reserve media option enabled. The reserve media option can be enabled or disabled according to the configuration for the corresponding SCHRC VL of the transmitted SCHRC frame to assume or not assume the shuffle time penalty at the Tx ES 102, as discussed above. At the input port of the first hop switch 104-1, the SCHRC VL is configured as an RC VL on arrival of the SCHRC frame. For example, the RC class priority RC5 or RC4 can be used. In addition, an RC bandwidth allocation gap (BAG) window policing is enabled. For policing, the BAG is configured based on the period of the SCHRC VL. The jitter (e.g. maximum allowable jitter) is set to a predefined percentage of the period (e.g. 5-10% of the period) as specified by the system integrator. At dispatch from the first hop switch 104-1, the SCHRC frame is scheduled as an RC frame (e.g. RC5 or RC4 priority).

At the input ports of the second hop switch 104-3, third hop switch 104-4, etc., the SCHRC VL is configured as an RC VL on arrival of the SCHRC frame. However, BAG/jitter policing is disabled at the second hop switch 104-3, third hop switch 104-4, etc. in some embodiments. For example, in some embodiments, each of the switches 104 is a high-integrity switch and, thus, the arrival window policing can be disabled after the first hop switch 104-1. In an alternative embodiment, the arrival window policing discussed above can be configured at the input ports of each hop switch rather than only at the first hop switch 104-1, even if each hop switch 104 is a high integrity switch.

At dispatch from the second hop switch 104-1, the third hope switch 104-4, etc., the SCHRC frame is scheduled as an RC frame (e.g. RC5 or RC4 priority). At the input port of the Rx ESs (e.g. Rx ES 106-1, 106-2, 106-3), the SCHRC frame is configured with an RC class priority on arrival. In addition, RC redundancy management and integrity checking is enabled at the Rx ESs 106.

Arbitrary rates/periods are also allowed for BE traffic. BE traffic is treated as unicast (e.g. a single receiver) in the examples described herein. Additionally, BE traffic is not specified as virtual links as the BE traffic is non-critical traffic and the virtual links are reserved for critical traffic such as TT, RC, SCHRC, and Synchronization traffic. BE traffic is specified with message rate/period and message size. Additionally, in the embodiments described herein, the NST 300 only supports a single plane for BE traffic. Furthermore, BE traffic is not scheduled on the global time link. Thus, BE traffic is unscheduled. The NST 300 configures the switch routing tables for BE traffic from a switch input port to one or more switch output ports at each switch between the Tx ES 102 and the corresponding Rx ES 106 using a shortest path algorithm in some embodiments. In particular, in some such embodiments, a Floyd-Warshall algorithm known to one of skill in the art is used.

Provisioning for the Impact of Synchronization Frames

In addition, to the configuration paradigms for TT, RC, SCHRC, and BE traffic, the NST 300 is configured to take into account the impact of synchronization frames as utilized by time-triggered protocols such as AS6802. The setup of a synchronization and global time base is understood by one of skill in the art and not discussed in detail herein. For example, the time base is setup to take into account the specified fault tolerance (e.g. single fault tolerant, 2 fault tolerant, etc.), start up requirements (e.g. how the end stations and switches join the global time base initially) and tear-down requirements (e.g. how the end stations and switches can be turned on and off). Additionally, the routing paths for communicating the synchronization frames are setup based on the specific network topology and other architecture requirements.

The NST 300 is configured to manage the flow of the synchronization frames with respect to their scheduling and timing implications. In particular, a subset of the end stations with high integrity NICs are designated as Timing Masters (TM). In some embodiments, up to 16 end stations can be designated as a Timing Master. A subset of the switches in the network that are high integrity switches are designated as Compression Masters (CM). In some embodiments, one switch from each network plane is designated as a CM. Each TM transmits a timing signal to one of the CM. Each CM then calculated a compressed time based on all the respective timing signals it received from the respective TM.

All synchronization frames are treated as RC VLs with the highest priority (e.g. RC7) between TMs and CMs. RC7 traffic is treated as higher priority than TT traffic, SCHRC traffic, RC traffic, and BE traffic. There are two types of synchronization frames. The first type of synchronization frame involves unicast frames from each TM to each CM. That is, each TM transmits a timing signal to one of the CM in a unicast frame. Each CM then calculates a compressed time based on all the respective timing signals it received from the respective TM. The second type of synchronization frame involves multicast frames from each CM to all end stations. That is, each CM sends the compressed time to all of the end stations in multicast frames. Each end station then calculates the global time based on each compressed time received from respective CM. For a two-fault tolerant system, at least 5 TM and 3 CM are used The synchronization frames are configured to occur periodically every predetermined synchronization period. For example, the synchronization frames can be configured to occur at the rate of 100 Hz and thus, the synchronization period is 10 ms which is a system wide fixed constant. The constant for the synchronization period is used to calculate a system precision factor which is a system wide constant. The system precision constant can be expressed by the following exemplary equation 1:

$$2 \times \#FallbackCycles \times WorstcasePrecisionFactor \times \rho \times SynchronizationPeriod \quad \text{Eq. 1}$$

It is to be understood that equation 1 is presented by way of example only and is not required in all embodiments. Equation 1 accounts for uncertainty of having to resynchronize the nodes in the system. For example, equation 1 accounts for situations such as when a node loses synchronization and then attempts to resynchronize. In the above equation the factor of 2 accounts for opposite directions of the clock. The number of fallback cycles represents the number of lost synchronization cycles based on system requirements. For example, 2 fallback cycles permits 1 lost synchronization cycle. The number of fallback cycles can be set by a user, such as the system integrator. The worst case precision factor is computed based on analysis of the system as a whole by the NST 300. The factor, $\rho$, is the clock oscillator accuracy at the different end stations and switches. The factor, $\rho$, represents a system precision parameter and is expressed in parts per million (ppm). For example, if the synchronization period is 10 ms, the clock accuracy is 100 ppm, and the worst case precision factor is 4, then the system precision factor is 16 microseconds ($\mu s$) (e.g. $2 \times 2 \times 4 \times 100 \times 10^{-6} \times 10 \times 10^{-3}$ secs=16 us). The system precision factor is used by the NST 300 to take into account the impact of the synchronization frames on the other frames in the network when computing the configuration and scheduling tables.

Hence, the NST 300 scheduled dispatches for Synchronization Traffic from TMs and CMs at specific times per synchronization period when the system is in synchronization and in equilibrium state. Startup and Tear-down scenario (e.g. how system gets into sync and out of sync) is accounted for in scheduling of both synchronization traffic and TT Traffic. The synchronization traffic bandwidth is completely scheduled first with highest RC priority (e.g. RC7) through the system before scheduling other message classes.

TT traffic is scheduled next after the synchronization traffic on the global time line (e.g. a coordinated transmission across all ESs with respect to the global time line and scheduled for one SlotTime per VL period). SlotTimes are discussed in more detail below. TT Traffic is treated as TT class and dispatches according to a fixed schedule (table) from the Tx ES 102. The TT Traffic is scheduled so as not to interfere with synchronization traffic (periodic). The TT traffic is scheduled when the system (e.g. ESs and Switches) is synchronized and so TT traffic will not be impacted by synchronization traffic. However, the NST 300 still accounts for interference from synchronization traffic that occurs during startup and teardown when the system (e.g. ESs and switches) is not completely or partially synchronized.

Hence, the TT and Synchronization traffic is dispatched from the respective Tx ES 102 at pre-determined specific dispatch times with respect to a global timeline or schedule. Additionally, the TT and Synchronization traffic is guaranteed the least end-to-end worst case latency as specified by the slot time discussed herein. For example, by reserving the two highest priorities in the system for TT and Synchronization traffic, the lowest latencies are guaranteed for TT and Synchronization traffic. Jitter is a variance of latency or the difference between maximum and minimum latency observed on the network. Hence, TT and Synchronization traffic, which have the lowest latency, are guaranteed the least jitter.

Furthermore, as discussed herein, TT and Synchronization traffic are tied to a global schedule. Hence, TT and Synchronization traffic have coordinated dispatches from every Tx ES 102 on the global time or schedule. That is, the traffic is injected into the network at specified times to ensure controlled interference (e.g. zero or a fixed number of maximum interference) from all traffic in the network (e.g. at end stations and switches) and to ensure the least interference from all traffic and thereby ensure the least jitter. For critical traffic, the TT and Synchronization frames have a fixed latency and jitter with zero loss.

SCHRC traffic is scheduled next on the local time line for its respective Tx ES. That is, there is no coordination of transmission across all ESs on the global time-line. Additionally, the SCHRC traffic is scheduled for only the transmission time, not the whole SlotTime, from Tx ES 102 per VL period. SCHRC traffic is treated as a TT class at dispatch from Tx ES and is treated as a next priority RC message after the TT class (e.g. less priority than RC6) at switch hops 104 and Rx ESs 106. In some embodiments, a limited number of the available priorities can be reserved exclusively for SCHRC.

SCHRC traffic is dispatched from the respective Tx ES 102 at pre-determined specific dispatch times with respect to a local time or schedule. Thus, SCHRC traffic is rate shaped at the Tx ES. SCHRC traffic is guaranteed the next best end-to-end worst case latency after the TT and Synchronization traffic as specified by the SlotTime. This is accomplished by reserving the next highest priority after TT and Synchronization for SCHRC traffic. As a result, SCHRC traffic also has the next best jitter after TT and Synchronization traffic. SCHRC traffic has un-coordinated dispatches between two different messages transmitted from two different Tx ESs 102. That is, each Tx ES 102 only coordinates between two different messages transmitted from the same Tx ES 102 on the local time line. This removes traffic injection interference at the source Tx ES 102, but does not coordinate between 2 different sources and so interference at subsequent switch hops and Rx ESs is possible. The SCHRC traffic has bounded latency and jitter for critical traffic and zero losses.

RC traffic is unscheduled traffic with no-coordination of dispatches on the global or local time line from the Tx ES 102. RC Traffic is treated as RC Class messages at the Tx ES 102, Rx ESs 106 and all the switches. The priority of the RC messages can be the same as, lower, or higher than SCHRC message priorities based on the specific implementation. However, the RC traffic has a lower priority than TT traffic or Synchronization traffic. RC traffic is dispatched with unspecified (e.g. not pre-determined) dispatch times with respect to the global time from the Tx ES 102. Since RC traffic may have the same priority as SCHRC traffic, RC traffic is also guaranteed the next best end-to-end worst case latency as specified by the SlotTime after TT and Synchronization traffic. Similarly, RC traffic is also guaranteed the next best jitter after TT and Synchronization traffic.

Dispatch of the RC traffic is uncoordinated from every Tx ES 102 on the global timeline. Thus, there is no control over interfering traffic with the network. That is, the interference cannot be limited to zero or a fixed number of maximum interference. However, the worst behavior for total traffic interfering with a given message is known a priori and can be bounded, but does not have the control or limits as with TT, Synchronization, and SCHRC traffic. Thus, RC traffic has bounded latency and jitter for critical traffic and zero loss.

BE Traffic is unscheduled traffic with no-coordination and has the lowest priority traffic in the system. BE traffic is dispatched with unspecified dispatch times with respect to the global timeline from the respective Tx ES 102. BE traffic is not rate shaped from the respective Tx ES. BE traffic is guaranteed the worst end-to-end worst case latency as specified by the respective SlotTime since BE traffic has the lowest priorities. In addition, the computed SlotTime can be potentially infeasible (e.g. worst case latency is greater than the period) and indicates, in such scenarios, potential loss of data. Additionally, BE traffic is guaranteed the worst jitter. There is no control over interfering traffic for BE traffic and the NST 300 is configured to attempt to calculate latencies and jitter. The NST 300 then reports whether the latency and jitter are feasible or not. For critical traffic, BE traffic has bounded latency and jitter and potential loss. BE traffic is essentially allocated whatever is leftover after allocations to Synchronization, TT, SHCRC, and RC traffic.

Variable Slot Times

Slot times represent the end to end latency (e.g. time from transmission to reception). In other words, the slot time is the amount of time which needs to be scheduled on the timeline for the traffic to be received. That is, the slot time represents a worst case scenario for the time it takes from the first bit sent to the last bit received. Conventionally, a slot time is fixed for the system based on a worst case scenario for end to end latency. However, in some embodiments described herein, the slot times are variable depending on the message size and calculated interference. That is, the NST 300 calculates the routing pattern and takes into account the routing pattern to calculate a variable slot size. In particular, the NST 300 calculates the interference through the system based on the relative priorities of messages and determines a variable slot time based on the calculated interference.

For example, with respect to synchronization traffic, the NST 300 calculates the variable slot time using the equation 2 below in some embodiments.

$$\text{Slot Time} = \max\nolimits_{\textit{for all TMs/CMs}} \{\text{worst case latency on routing path between TM and CM}\} + \max\nolimits_{\textit{for all TMs/CMs}} \{\text{worst case latency on the routing path between CM to all TMs}\} \quad \text{Eq. 2}$$

In Equation 2, the worst case latency includes the sum of transmission times at the Tx ES of a Timing Master or at a switch of a Compression Master and every switch hop between the TM and the CM. The worst case latency also includes the sum of the maximum link propagation times in the path between the TM and the CM. This includes both the signal propagation time through the cable, which depends on the cable length (e.g. 1 nanosecond per meter), and the physical transmission and reception overhead or media time which can be obtained from a datasheet for the physical device. The worst case latency also include the sum of the maximum technology delays in the specific paths. These delays are the overhead characterized for the end station and switch processing and performance. Furthermore, the worst case latency includes the sum of shuffle times in the specific paths. The shuffle time or shuffle penalty is the transmission time of a maximum sized Ethernet message over each of link in the routing path based on the respective link rate. The shuffle times are added at the TM and at switches during dispatch transmissions at output/dispatch ports up to CM from the TM or up to the TM from the CM.

The equation 2 utilizes the maximum worst case latencies from all of the TMs and CMs. The NST 300 also calculates one slot time for all the synchronization virtual links together rather than separate slot times for each synchronization virtual link in this example. The slot time for all synchronization VLs is scheduled explicitly on the global time link at the specified synchronization period.

With respect to TT traffic, the NST 300 calculates the variable slot time using the equation 3 below in some embodiments. In particular, the NST 300 calculates a separate variable slot time for each TT virtual link which is scheduled explicitly on the global time line at the specified period for the respective TT virtual link and respective message size.

$$\text{Slot time} = \text{SystemPrecision} + \text{SynchronizationPenalty} + \max\nolimits_{\textit{all RxES, all network planes}} \{\text{worst case latency on routing path between Tx ES and Rx ES}\} \quad \text{Eq. 3}$$

Similar to above, the worst case latency includes the sum of transmission times at the Tx ES 102 and all the switches 104 in the path to the corresponding Rx ES. Additionally, as with the synchronization VLs, the worst case latency for the TT VLs includes the sum of maximum link propagation times, sum of maximum technology delays, and the sum of shuffle times. It is to be understood that the sum of shuffle times is dependent on the configuration option selected with respect to shuffle times discussed above.

The system precision factor is defined above with respect to equation 1. The synchronization penalty represents the worst case interference in timing due to end stations and switches trying to establish synchronization or maintain synchronization. For example, the synchronization penalty can be computed based on the transmission time of a worst case estimate of the number of synchronization messages impacting the TT virtual link times the size of the synchronization message, and on the transmission time over different links along the routing path for the respective TT virtual link.

With respect to Scheduled RC traffic, the NST 300 calculates a separate variable slot time for each SCHRC virtual link. The slot time for the SCHRC virtual links is computed similar to the variable slot time for the TT virtual links using equation 3 above. However, the respective slot time for each SCHRC virtual link is scheduled explicitly on a local time line for the respective Tx ES at the specified period for the respective SCHRC virtual link and respective message size. Thus, the variable slot time for the SCHRC virtual links only reserves a transmission time from the respective Tx ES.

Additionally, the worst case latency for the respective SCHRC virtual links includes only the shuffle times for the respective Tx ES and not the entire routing path for the respective SCHRC virtual link. Furthermore, the worst case latency for the respective SCHRC virtual links includes a sum of queuing latencies in the routing path. The queuing latencies/times are defined as the worst case wait time in the queues at each dispatch/output port until the current packet can be transmitted from the output/dispatch port. Since transmission from the respective Tx ES is scheduled on the local time line, there is no queuing latency at the Tx ES. Thus, the sum of queuing latencies does not include the respective Tx ES. Queuing latencies are discussed in more detail below.

With respect to RC traffic, the NST 300 calculates the variable slot time for each RC virtual link similar to the calculation for the SCHRC virtual links That is, in Equation 3, the worst case latency for RC traffic includes the sum of transmission times, sum of maximum link propagation times, sum of maximum technology delays, and the sum of queuing latencies. However, the sum of queuing latencies for RC virtual links includes the queuing latencies over the entire respective routing path, whereas for SCHRC virtual links the Tx ES is excluded. In addition, the worst case latency for RC virtual links does not include a sum of shuffle times as with TT virtual links and SCHRC virtual links. It should be noted that none of the slot times for RC virtual links are scheduled on the global timeline or on a local timeline.

The NST 300 calculates the variable slot times for BE frames in the same manner as RC virtual links. That is, in Equation 3, the worst case latency for BE frames includes the sum of transmission times, sum of maximum link propagation times, sum of maximum technology delays, and the sum of queuing latencies. As with RC virtual links, the sum of queuing latencies for BE frames includes the queuing latencies over the entire respective routing path. Additionally, as with RC virtual links, the variable slot times for BE frames are not scheduled on the global time line or on a local time line.

Green Zone Based Phase Optimization

The NST 300 schedules TT traffic within a timeframe referred to herein as the green zone. The NST 300 calculates the green zone based on the timing information available about the producing host (e.g. Tx ES 102) and all consuming hosts (e.g. switches 104 and Rx ES 106) for a specified virtual link. The green zone specifies the constraints to the NST 300 to schedule virtual links to coordinate phases on the global timeline between different hosts, such as between producer and consumer hosts of a virtual link, especially without overriding buffers on end stations. The green zone also specifies the "valid" time on the timeline within which the NST 300 must find the respective schedule for the virtual link. Hence, the green zone takes into account the phase relationship between the producing host and the consuming hosts. In particular, the green zone is used to make sure that a frame arrives at the time the consumer needs it. For example, the green zone is used to ensure that a frame scheduled after a producing host has the frame ready to transmit and that the frame is received by the consuming host is ready to receive it.

The hosts or Tx ES are categorized into two types based on the amount of timing information available. The first category is asynchronous hosts (ASYNC) which provide only the rate at which virtual link is accessed by the asynchronous host. The second type is tightly-synchronized hosts (TIGHT) which provide more granular timing information. For example, tightly-synchronized hosts provide, in addition to the access rate, an offset into the major frame (e.g. hyperperiod) when the data will be accessed, which is expressed in units of minor frames (e.g. smaller period within a hyperperiod). Tightly-synchronized hosts also provide an offset into the minor frame to the start of data access and the duration of the access.

Due to the differing levels of granularity in the information provided by each host type, the NST 300 provides differing features when scheduling a virtual link. For example, with respect to tightly-synchronized hosts, the NST 300 supports maintaining consistent phase relationships between producing and consuming hosts, a lack of conflicts between Network Interface Card (NIC) access and Host access to packet buffers, protection from data loss, and guaranteed and consistent message transmit and receive network time slot windows throughout the major frame. However, with respect to asynchronous hosts, the NST 300 does not support maintaining consistent phase relationships between producing and consuming hosts or a lack of conflicts between Network Interface Card (NIC) access and Host access to packet buffers. Furthermore, with respect to protection from data loss for asynchronous hosts, the NST 300 provides a report that suggests when data loss may occur. System designers can then adjust the input data specifications to alleviate the situation, such as by increasing buffering in the asynchronous host NIC to prevent data loss. Any host specified as loosely-synchronized (LOOSE) is treated functionally by the SNT as an asynchronous host.

Thus, the NST 300 is limited in its support of asynchronous hosts to evaluating the relationship between virtual link rate and access rate and the buffering specification in order to determine the potential for data loss. On the other hand, for tightly-synchronized hosts, the NST 300 satisfies timing relationships, since failure to satisfy tightly-synchronized host timing results in a virtual link that cannot be scheduled on the network.

Figure 5:
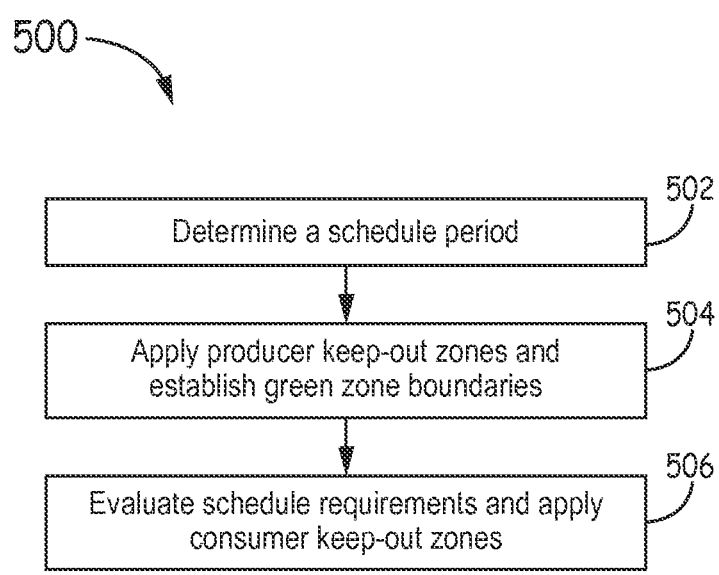
FIG. 5 is a flow chart depicting one embodiment of an exemplary method of calculating green zones.

The NST 300 calculates green zones by collecting host access window information to determine keep-out zones where the hosts may be accessing the data. The green zone calculation is an iterative process taking into account each tightly-synchronized host. One embodiment of an exemplary method 500 of calculating green zones is shown in FIG. 5. The method 500 can be implemented by the NST 300.

At block 502, a schedule period is determined. For example, the schedule period of a TT virtual link is first defined as the inverse of the rate specified in Hertz (Hz) within the virtual link definition. The NST 30 then examines the producer access rate. If the rates do not match, a warning is reported and the producer access rate is used to determine the TT schedule period. The rate used to determine the schedule period will be referred to herein as the determined schedule rate.

At block 504, producer keep-out zones are applied and green zone boundaries are established. Producer keep-out zones are determined differently for different host types. For example, producer keep-out zones are not generated for asynchronous hosts. For tightly-synchronized hosts, the major frame offset or the first access minor frame, along with the minor frame offset and the offset duration of the host access operation, are taken into account to determine the keep-out zone. The exemplary calculations discussed below are used to establish initial green zone boundaries for tightly-synchronized producer hosts.

The major frame offset value is first normalized based on the access rate used to determine the schedule period. Valid ranges for the major frame offset values can be summarized as:

$$0 \leq \text{major frame offset} \leq \frac{\text{minor frame rate}}{\text{determined schedule rate}}$$

Normalization of the value can be accomplished using the following pseudo-code:

normalized major frame offset$_{producer}$ =

$$\text{major frame offset } \% \frac{\text{minor frame rate}}{\text{determined schedule rate}}$$

After normalizing the major frame offset, the green zone boundaries can be established. The beginning of the green zone corresponds to the end of a first producer keep-out zone and the end of the green zone corresponds to the beginning of a second following producer keep-out zone. The precision of the synchronization of network time is also taken into account to guarantee data integrity in the event of the frame drift reaching a maximum value (e.g. worst case frame drift). The worst case frame drift across the entire message transmission period is calculated from system design parameters and applied to the start and end of keep-out zones. The inclusion of the worst case frame drift (also referred to herein as 'max period drift') enables the NST 300 to account for the precision of the network synchronization algorithm across all the modules on the network. The producer start point is calculated using the following equation 4:

$$\text{producer start} = \frac{\text{normalized major frame offset}_{producer}}{\text{minor frame rate}} + \text{minor frame offset} \quad \text{Eq. 4}$$

The producer end point, which is equal to the following green zone boundary beginning, is given by equation 5:

producer end=gz_boundary_start=producer start+ offset duration+max period drift   Eq. 5

The producer start point can also be adjusted to include the worst case frame drift as shown in Eq. 6:

producer start=producer start−max period drift   Eq. 6

As mentioned above, the green zone boundary end is the same as the beginning of the next producer start point and is given by equation 7 below:

$$\text{gz\_boundary\_end} = \text{producer start} + \frac{1}{\text{determined schedule rate}} \quad \text{Eq. 7}$$

For producer hosts that are asynchronous, the NST 300 produces a green zone that encompasses the entire message transmit period. Thus, the green zone boundary start is equal to zero and the green zone boundary end is equal to the inverse of the determined schedule rate parameter.

At block 506, schedule requirements are evaluated and consumer keep-out zones are applied. For example, the overall initial green zone boundaries determined above can be used to shrink the green zone by applying consuming host keep-out zones (also referred to as consumer keep-out zones). In some embodiments, consumer keep-out zones are applied iteratively for all tightly-synchronized consuming hosts. The direction in which green zones are tightened or shrunk depends on the scheduling requirement for the respective virtual link.

Figure 19A:
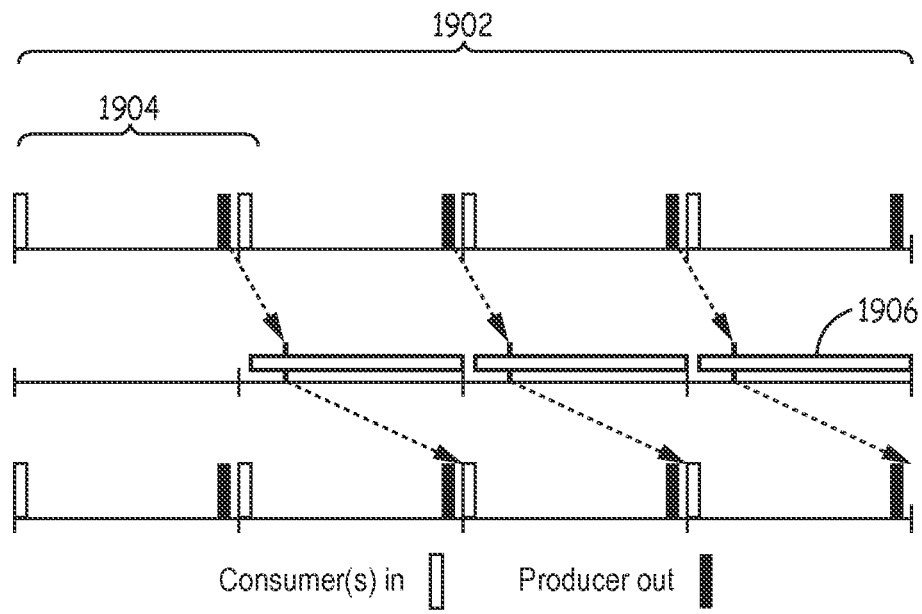
FIG. 19A illustrates one exemplary embodiment of normal pass scheduling.

Two types of scheduling are supported by the NST 300. Most scheduling is based on a super-period green zone which is also referred to herein as "normal" scheduling. Super-period green zone means that the data transport delay induced by the network schedule will most likely result in an end-to-end host latency that is greater than the schedule period of the message. This indicates that the green zone will begin after the latest consumer keep-out zone and end prior to the beginning of the producer keep-out zone. A high level example of normal pass scheduling is shown in FIG. 19A which depicts the major frame 1902, minor frame 1904, and green zone 1906.

Figure 19B:
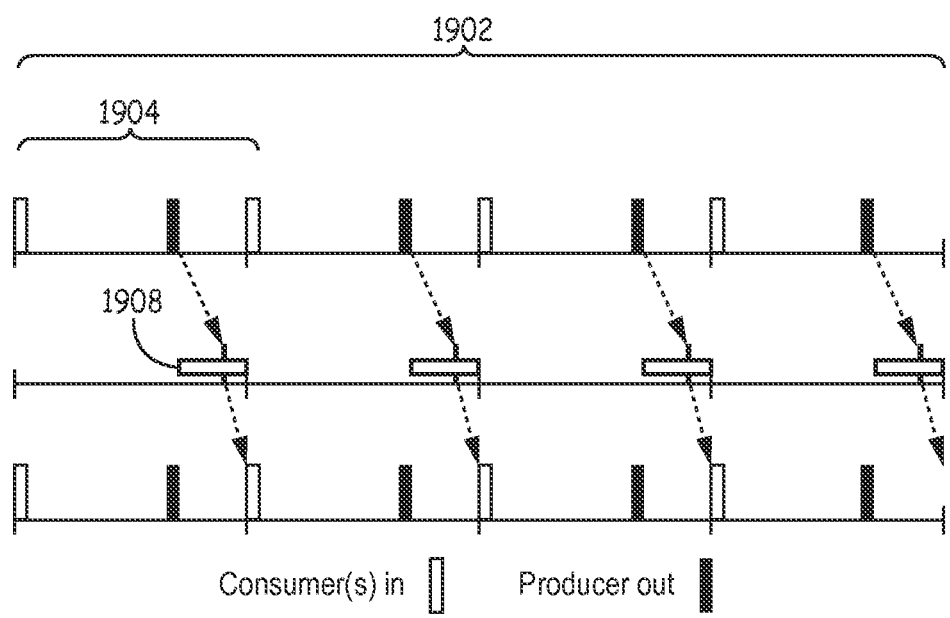
FIG. 19B illustrates one exemplary embodiment of fast pass scheduling.

The second type of scheduling is sub-period scheduling, also referred to herein as "Fast Pass" scheduling. Fast pass scheduling guarantees a schedule-induced data transport delay of less than the schedule period of the message. This indicates that the green zone will begin after the producer keep-out zone and end prior to the beginning of the earliest consumer keep-out zone. Both super-period and sub-period scheduling result in a green zone that is contained within the previously-calculated values of gz_boundary_start and gz_boundary_end. A high level example of fast pass scheduling is shown in FIG. 19B which depicts the major frame 1902, minor frame 1904, and sub-period green zone 1908.

The NST 300 calculates a keep-out zone for consumers using a calculation similar to the calculation used for the producer keep-out zone. However, for the consumer keep-out zone, the NST 300 utilizes a maximum access rate specified between the producer and consumer hosts. That is, the NST 300 alters the manner in which the normalized major frame offset is calculated for the consumer host. In particular, instead of using the determined schedule rate for the calculation, the maximum available rate is used, as shown below.

$$\text{normalized major frame offset}_{consumer} = \text{major frame offset } \% \frac{\text{minor frame rate}}{\text{maximum available rate}}$$

The maximum available rate represents the fastest access rate between the producer and the consumer host being evaluated by the NST 300. In addition, the major frame offset value is normalized by subtracting the normalized major frame offset value found for the producing host. By utilizing the periodic nature of the scheduled network communication and corresponding hosts' access patterns, the NST 300 normalizes the consumer schedule to allow a schedule-period based reference frame to be established.

The NST 300 moves the consumer keep-out zone to the right of the producer keep-out zone for use in calculating the green zone.

Consumer start and end points can then be determined with the normalized major frame offset value for the consumer host according to the following equations, utilizing the minor frame offset and offset duration parameters of the respective consumer host. Equations 8-10 are performed by the NST 300 in the following order such that the max_period_drift parameter is properly included.

$$\text{consumer\_start} = \frac{\text{normalized\_major\_frame\_offset}_{consumer}}{\text{minor\_frame\_rate}} + \text{minor\_frame\_offset} \qquad \text{Eq. 8}$$

$$\text{consumer\_end} = \text{consumer\_start} + \text{offset\_duration} + \text{max\_period\_drift} \qquad \text{Eq. 9}$$

$$\text{consumer\_start} = \text{consumer\_start} + \text{max\_period\_start} \qquad \text{Eq. 10}$$

In normalizing the consumer keep-out zone, the NST 300 ensures that the consumer keep-out zone occurs later in the timeline than the producer keep-out zone. This places the consumer keep-out zone within the boundary of the green zone and can differ for the two different scheduling types discussed above. By adding the inverse of the maximum available rate parameter to both the consumer start and the consumer end points in time, the NST 300 can determine normalized periodic instances of the consumer's keep-out zone.

For sub-period scheduling, the NST 300 uses the first consumer keep-out zone to occur after the producer keep-out zone. Thus, the NST 300 finds the first consumer instance following the green zone boundary start point. Additionally, the NST 300 increments the consumer keep-out zone start and end times by the inverse of the maximum available rate while the start time of the consumer keep-out zone is less than the end time for the producer keep-out zone.

For super-period scheduling, the NST 300 uses the last consumer keep-out zone to occur before the next producer keep-out zone. Thus, the NST 300 finds the last consumer keep-out zone prior to the green zone boundary end. Additionally, the NST 300 increments the consumer keep-out zone start and end times by the inverse of the maximum available rate while the start time is less than the sum of the end time for the producer keep-out zone and the inverse of the maximum available rate parameter.

The NST 300 applies the consumer start and end parameters to respective consumer host types based on the requirements for the type of scheduling used, e.g. super-period or sub-period scheduling requirements. For sub-period scheduling, the green zone boundary end parameter is reduced to be equal to the consumer start parameter if the consumer start parameter is within the bounds of the green zone. The NST 300 also takes into account protection against producer and consumer overlap by increasing the green zone boundary start parameter to the consumer end parameter value if the consumer end is within the bounds of the green zone after the consumer start correction is applied.

For super-period scheduling, the NST 300 increases the green zone boundary start parameter to be equal to the consumer end parameter if the consumer end parameter is within the bounds of the green zone. The NST 300 then evaluates the consumer start parameter. If the consumer start parameter is within the green zone boundaries after the consumer end correction is applied, the event is considered a schedule failure. In addition, regardless of whether sub-period or super-period scheduling is used, a fully-encapsulated green zone where the consumer start and end parameters fall outside of the green zone bounds, but contain the green zone entirely, is also considered a schedule failure.

In situations where a consumer accesses a high rate virtual link at a rate lower than the specified virtual link rate, input design specification data may constrain the green zone of the traffic such that data set congruency between the consumer hosts may not be possible. Congruency in this document refers to the reception of data in identical phase boundaries. For example, if a 40 Hz virtual link is consumed by two consumer hosts at 20 Hz each, the input design data may indicate that the first consumer host reads the data minor frame 0 while the second consumer host reads the data in minor frame 1. Although the NST 300 is configured to maintain proper phase relationships between the producer and each consumer, the consumer hosts in the above example, would consistently receive incongruent data from the same data stream. Hence, the NST 300 is configured to detect such situations and issue a warning in output reports.

Additionally, for each virtual link with tightly-synchronized host relationships and sub-period scheduling, either the producing host or one or more consuming hosts may specify a maximum green zone parameter in lieu of minor frame offset start and duration information. In such embodiments, the NST 300 calculates the respective keep-out zones with the other tightly-synchronized hosts as a reference point for specifying a maximum green zone. Specifying a maximum green zone indicates that the respective host either bases its scheduling on the output of the NST 300 or has knowledge of the other producing or consuming hosts of that virtual link.

For a producing host with a maximum green zone specification, the NST 300 first calculates the green zone boundary start and the green zone boundary end parameters with the producer keep-out zone start and green zone boundary start equal to zero. Before the application of the tightly-synchronized consumer keep-out zones, the NST 300 finds the new green zone boundary start value by subtracting the maximum green zone value from the adjusted green zone boundary end value. If this results in a negative number, the NST 300 wraps the negative portion to the end of the schedule period and evaluates consumer keep-out zone end points to prevent overlap.

For each consuming host with a maximum green zone specification, the NST 300 uses the green zone boundary start parameter plus the maximum green zone specification as the consumer keep-out zone start point to be used in the green zone boundary adjustment. The green zone boundary start parameter represents the end of the producer keep-out zone. The consumer keep-out zone start point should not exceed the boundary of schedule period since the maximum green zone values should be less than the period of the virtual link.

Priority and Scheduling Virtual Links

As discussed above, multiple priority levels are supported by the NST 300 and network 100. For example, in the embodiments, described herein 8 priority levels (RC0 through RC7) are supported. As stated above, the highest priority level, RC7, is reserved for synchronization traffic and the next highest level, RC6, is reserved for TT traffic in some embodiments. The priority levels for SCHRC traffic and RC traffic are selected from the remaining priorities (i.e. RC5, RC4, RC3, RC2, RC1, and RC0). For example, the NST 300 can be configured with two priority lists, one for SHCRC traffic and the other for RC traffic. The NST 300 assigns priorities from the respective list, as discussed in more detail below. In some embodiments, the priority list for SCHRC traffic is identical to the priority list for RC traffic. In other embodiments, the priority list for SCHRC traffic is distinct from the priority list for RC traffic with no overlap. In yet other embodiments, the list for SCHRC traffic is different from the list for RC traffic, but there are one or more priorities in common on both lists. Additionally, in some embodiments, all of the priorities for SCHRC traffic are selected to be higher priority than all the priorities for RC traffic such that SCHRC virtual links get better latency/jitter performance than all RC virtual links.

Figure 6:
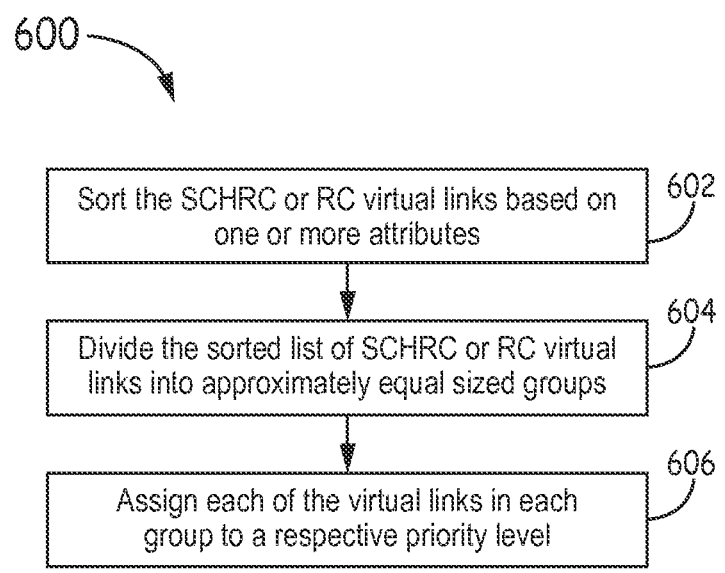
FIG. 6 is a flow chart depicting one embodiment of an exemplary method of assigning priorities.

FIG. 6 is a flow chart depicting one embodiment of an exemplary method 600 of assigning priorities. The method 600 can be used to assign priorities for both SCHRC traffic and RC traffic. Additionally, the method 600 can be performed or implemented by the NST 300 discussed above. At block 602, the SCHRC or RC virtual links are sorted based on one or more attributes. For example, in some embodiments, the SCHRC or RC virtual links are sorted based on one or more of Rate/Period, message size, and maximum number of hops between the Tx ES and any of the potential Rx ES. In particular, in some embodiments, the SCHRC or RC virtual links are first sorted based on the rate/period, with the higher rate/smaller period first, then based on the message size, with the larger message first, and then on the maximum number of hops, with the smaller number of hops first.

At block 604, the sorted list of SCHRC or RC virtual links is divided into approximately equal sized groups, where the number of groups is equal to the number of priorities available for the SCHRC or RC traffic, respectively. For example, if three priorities are available for SCHRC virtual links, then the sorted list of SCHRC virtual links is divided into three approximately equal sized groups. This is also referred to as a priority level balancing approach where each SCHRC/RC priority has a similar number of virtual links or flows as the other SCHRC/RC priority.

At block 606, each of the virtual links in each group is assigned to a respective priority level. That is, the first group of SCHRC virtual links is assigned to the first SCHRC priority, the second group of SCHRC virtual links are assigned to the second SCHRC priority, etc. For example, if the sorted list of SCHRC virtual links contains 25 virtual links or flows and there are 3 priorities (e.g. RC5, RC4, and RC3) available for SCHRC virtual links, then the first group of virtual links is assigned to the RC5 priority, the second group is assigned to the RC4 priority, and the third group is assigned to the RC3 priority.

The NST 300 also supports manual override of the assigned priorities. For example, in addition to or in lieu of the method 600, the NST 300 enables a user to specify an explicit priority map. For example, in one such embodiment, each SCHRC or RC virtual link with a specific rate/period is explicitly mapped to a respective priority in the SCHRC or RC priority list.

Figure 7:
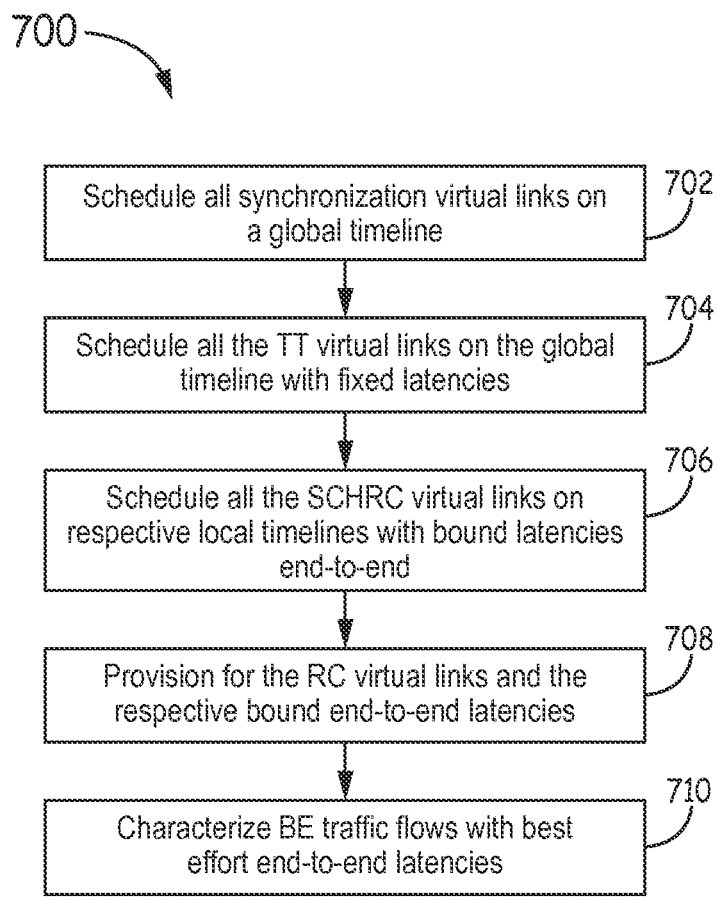
FIG. 7 is a flow chart depicting one embodiment of an exemplary method of scheduling traffic.

Once priorities are assigned to the respective traffic classes (e.g. synchronization, TT, SCHRC, RC, and BE), the NST 300 schedules or provisions the respective classes of traffic where appropriate. For example, in the embodiments described herein, RC and BE traffic classes are not explicitly scheduled, but the NST 300 provisions for RC and BE traffic as appropriate. One exemplary embodiment of a method 700 of scheduling traffic is shown in FIG. 7. Method 700 can be implemented by the NST 300 discussed above.

At block 702, all synchronization virtual links are scheduled on a global timeline. Although synchronization virtual links do not need to be scheduled explicitly because they have the highest priority and can preempt other traffic, the synchronization virtual links are explicitly scheduled in this embodiment so that TT virtual links on the global timeline do not subsequently pay a penalty for interference from the higher priority synchronization flows.

At block 704, all the TT virtual links are scheduled on the global timeline with fixed latencies. For example, in some embodiments, a best-fit process is used for the synchronization and TT flows based on the respective variable slot sizes discussed above. That is, the flows are simply arranged based on the slot sizes to fit all of the synchronization and TT flows on the global timeline. While this technique is quick it is less efficient in allocating bandwidth than other techniques. For example, another exemplary method of scheduling the synchronization and TT virtual links is described in more detail below with respect to FIG. 8.

At block 706, all the SCHRC virtual links are scheduled on respective local timelines with bound latencies end-to-end. An exemplary method of scheduling the SCHRC virtual links is described in more detail below with respect to FIG. 9. At block 708, the NST 300 provisions for the RC virtual links and the respective bound end-to-end latencies. At block 710, BE traffic flows are characterized with best effort end-to-end latencies. That is, the BE traffic does not receive special provisions or guarantees on latencies. Further details regarding the computation of queuing latencies for SCHRC, RC, and BE traffic is discussed in more detail below. At block 712, buffers at the end stations and switches are managed to ensure that each buffer has sufficient capacity and that link constraints are met. Further details regarding buffer management are discussed in more detail below.

Figure 8:
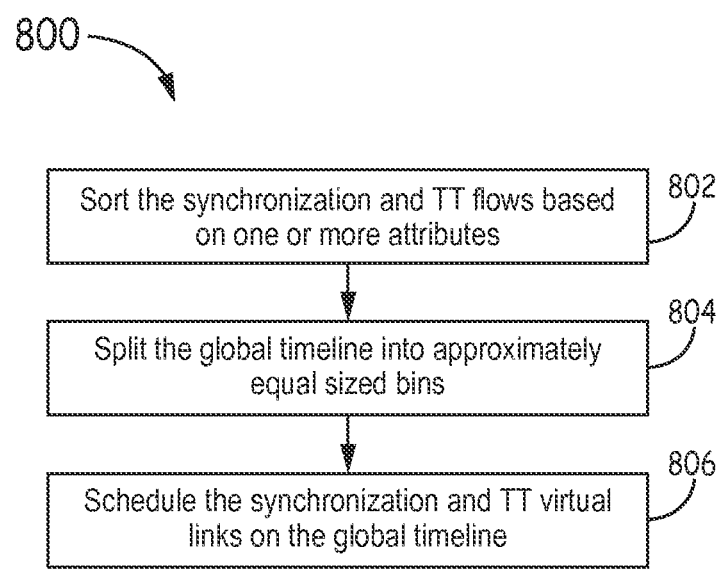
FIG. 8 is a flow chart depicting one embodiment of an exemplary method of scheduling synchronization and TT virtual links.

FIG. 8 is a flow chart depicting one embodiment of an exemplary method 800 of scheduling synchronization and TT virtual links. Method 800 can be implemented by the NST 300 discussed above. At block 802, the synchronization and TT flows are sorted based on one or more attributes. For example, in this embodiment, the synchronization and TT flows are first sorted based on the respective rate/period of the flows. In particular, the respective access rate of the TT virtual links and the synchronization period for the synchronization virtual links are compared. Thus, the flows are first ordered with faster rates/smaller periods first followed by slower rates/larger periods. The TT and synchronization flows are then ordered based on the scheduling type. That is, fast pass or sub-period scheduling flows are placed before normal pass or super-period scheduling flows. The TT and synchronization flows are then ordered based on green zone size per section. That is, flows having smaller green zones are placed before flows having larger green zones. In other words, smaller deadlines are placed before larger deadline which have lower end to end network latencies needs. TT and synchronization flows associated with earlier green zones are then placed before TT and synchronization flows associated with later green zones. Finally, the TT and synchronization flows are ordered based on the end-to-end reserved time slot sizes. That is, they are ordered based on the respective variable slot size. Thus, flows having a larger variable slot size are ordered before flows having a smaller variable slot size.

At block 804, the global timeline is split into approximately equal sized bins. The bin sizes are chosen to be at least larger than the largest variable size slot time for any synchronization virtual link and TT virtual links and to be smaller than the fastest rate/smallest period of all synchronization and TT virtual links. In splitting the timeline into approximately equal sized bins, only harmonic periods are considered. That is, the bin sizes, synchronization period and TT virtual link period are all harmonic to each other. In particular, the synchronization periods and TT virtual link periods are harmonic to (i.e. integer multiple of) the bin size.

Figure 10:
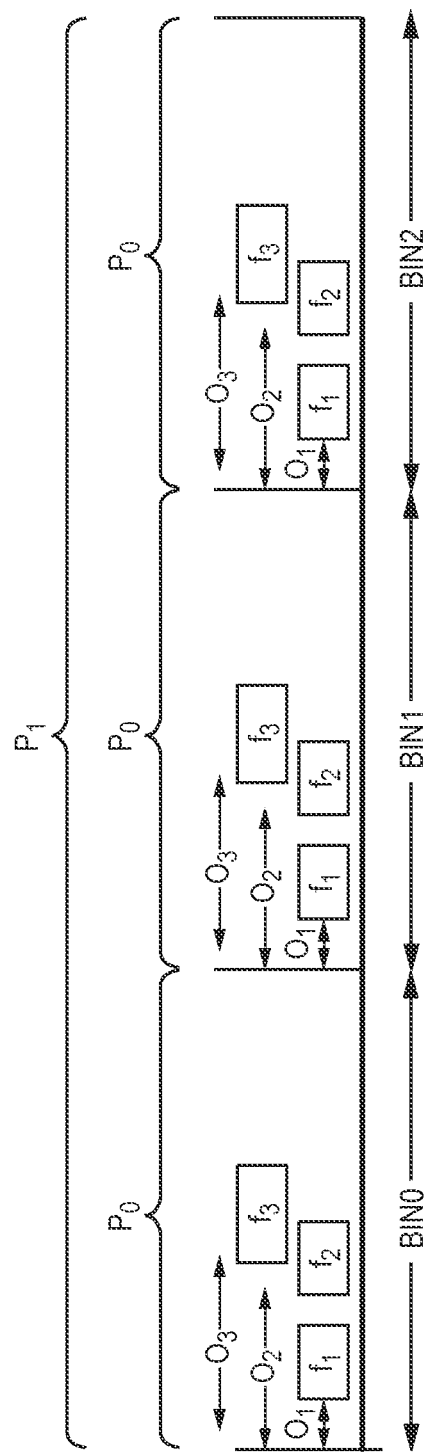
FIG. 10 depicts one embodiment of an exemplary cyclic global schedule.

At block 806, the synchronization and TT virtual links are scheduled on the global timeline. In scheduling the synchronization and TT virtual links, only the cyclic global schedule is considered. That is, the synchronization and TT virtual links are scheduled at the same point every period within the hyper-period, the hyper-period being an amount of time encompassing a plurality of periods. For example, as shown in FIG. 10, an iterative procedure is used. As shown in FIG. 10, flows f1, f2, and f3 are scheduled in each of bin0, bin1, and bin2 with offsets O1, O2, and O3, respectively.

As each virtual link (Synchronization first, then TT virtual link) is processed one at a time to be scheduled, the choice of the bin is determined by first finding all bins that either completely contain or overlap, with respect to the timeline, with the computed green zone for the respective virtual link being scheduled. This is a phase constraint with respect to fast pass or normal pass and valid time zone. This also takes into account producer & consumer(s) behavior within which the schedule must be found.

As part of scheduling the virtual links, the bins identified based on the above constraints are sorted. The NST 300 can be pre-configured to use the same sorting technique for the whole system or network. One exemplary sorting approach available for the NST 300 is a referred to as a pack-first approach. In the pack-first approach, the bins are selected from highest utilized bin to lowest utilized bin. That is, the NST 300 attempts to schedule virtual links in those bins which already have more scheduled virtual links, in terms of the variable slot size, before attempting to schedule virtual links in those bins with less number of scheduled virtual links. This approach improves bin packing efficiency and improves global schedulability of TT virtual links.

Another exemplary bin packing or sorting approach is referred to herein as a spread-first approach. In the spread-first approach, the NST 300 utilizes the bins in order from the lowest utilized bin to the highest utilized bin. That is, the NST 300 attempts to schedule virtual links in those bins which are empty or have the fewest number of scheduled virtual links before scheduling in those bins with more number of scheduled virtual links. One benefit of the spread-first approach is that the scheduled virtual links are more balanced throughout the bins which can lead to more gaps for SCHRC and RC virtual links to fit in between the synchronization and TT virtual links on the timeline, thereby giving SCHRC and RC a chance to have lower latency.

Figure 9:
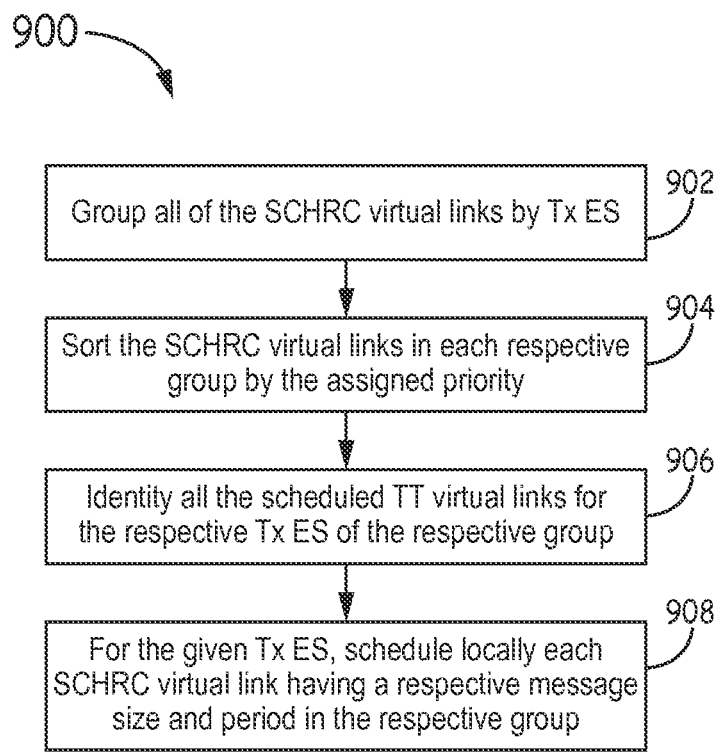
FIG. 9 is a flow chart depicting one embodiment of an exemplary method of scheduling SCHRC virtual links.

FIG. 9 is a flow chart depicting one embodiment of an exemplary method 900 of scheduling SCHRC virtual links. It should be noted that SCHRC virtual links are scheduled with pre-specified dispatch time with respect to the local time of the respective Tx ES. In contrast, the NST 300 does not configure a specific or exact dispatch time for RC traffic. Thus, SCHRC virtual links are traffic rate shaped from the respective Tx ES whereas RC virtual links are not traffic shaped. Method 900 is implemented by the NST 300 to determine the local dispatch times for the SCHRC virtual links.

At block 902, all of the SCHRC virtual links are grouped by Tx ES. That is all SCHRC virtual links originating at the same Tx ES are grouped together. At block 904, the SCHRC virtual links in each respective group are sorted by the assigned priority. If 2 or more SCHRC virtual links have the same priority, then the NST 300 scheduled the SCHRC virtual link with higher rate/period first and/or the larger message first. At block 906, all the scheduled TT virtual links for the respective Tx ES of the respective group are identified. The TT virtual links are scheduled prior to the SCHRC virtual links as discussed above. In some embodiments, only cyclic schedules are generated for the global timeline and the local scheduling for each respective Tx ES also only generates cyclic schedules. That is, the dispatches occur at the same offset within the period for every period within the hyper-period.

Figure 14:
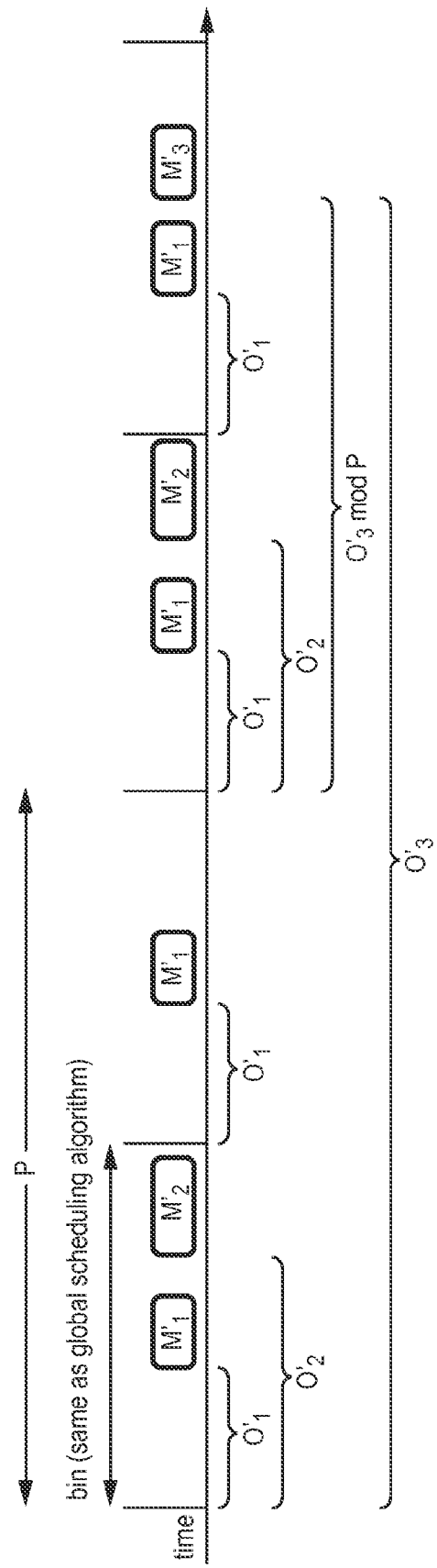
FIG. 14 depicts a scheduled dispatch offset adjusted relative to the period.

At block 908, each SCHRC virtual link having a respective message size and period in the respective group is scheduled locally for the given Tx ES. In particular, the local scheduling for each respective Tx ES includes marking on a timeline period the transmission busy slots for each scheduled VL (e.g. TT virtual links and already scheduled SCHRC virtual links). In some embodiments, the scheduled dispatch offset for the scheduled virtual links is adjusted relative to the period in which the virtual link is scheduled, as shown in FIG. 14, for example. In particular, in the example of FIG. 14, the offset O3 is adjusted to O3 mod P to be relative to the start of the respective period in which the VL M3 is scheduled. Each SCHRC virtual link has a respective message size and period. It should be noted that, in some embodiments, all TT virtual links and SCHRC virtual links have harmonic periods. That is the periods are multiples of each other. The transmission busy slots include both the message transmission time plus the header and inter-frame gap (IFG).

After marking the transmission busy slots, the first gap between transmission busy slots that can accommodate the given message size, header and IFG of the respective SCHRC virtual link being scheduled is identified. The offset relative to the given period is the scheduled time for the respective SCHRC virtual link.

Figure 11:
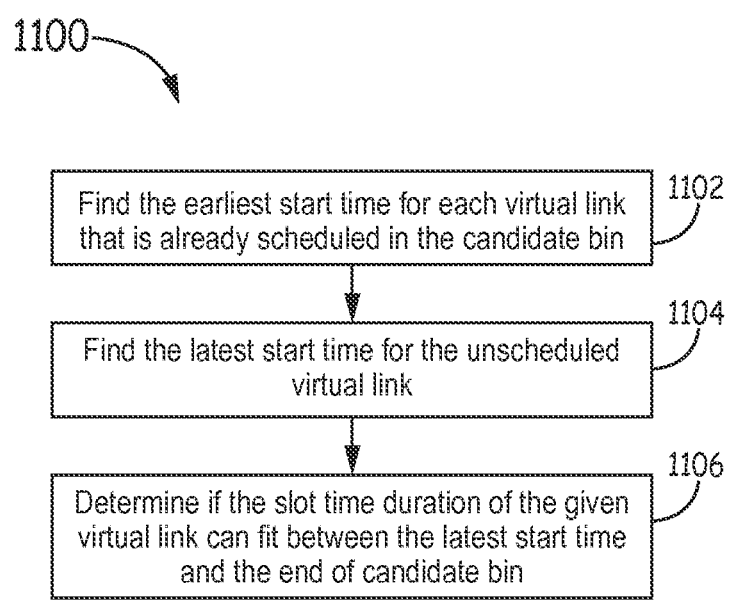
FIG. 11 is a flow chart depicting one embodiment of an exemplary method of determining if a candidate bin accommodates a slot time of a given unscheduled virtual link within the candidate bin.

FIG. 11 is a flow chart depicting one embodiment of an exemplary method 1100 of determining if a candidate bin accommodates a slot time of a given unscheduled virtual link within the candidate bin. At block 1102, the earliest start time for each virtual link (synchronization and/or TT) that is already scheduled in the candidate bin is found. The earliest start times are calculated based on zero interference along the common dispatch port in the routing paths of both unscheduled and scheduled virtual links as discussed in more detail below. Notably, in this embodiment, no interference needs to be calculated when first scheduling synchronization virtual links since synchronization virtual links are scheduled before all TT virtual links. Thus, synchronization virtual links are directly assigned to bins first within every period. When TT virtual links are being scheduled, then interference needs to be computed against both already scheduled synchronization virtual links as well as already scheduled TT virtual links.

At block 1104, the latest start time for the unscheduled virtual link is found after comparison of the given unscheduled virtual link against all of the scheduled virtual links in the candidate bin. At 1106, it is determined if the slot time duration of the given virtual link can fit between the latest start time and the end of candidate bin. If the slot time duration can fit, then the given virtual link is scheduled within the candidate bin and its scheduled global time is the latest start time discussed above. The latest start time is the scheduled time for the virtual link and the appropriate offset for the period of the virtual link is configured in the schedule table for the respective Tx ES.

From this globally scheduled time for the given virtual link, the "earliest" arrival at the $1^{st}$ hop switch of the first bit of a message on the given virtual link can be calculated. In addition, the "latest" arrival of the last bit of the message at the $1^{st}$ hop switch can be calculated, taking into account also that the respective Tx ES and the $1^{st}$ hop switch can differ in system precision, as discussed above. Based on the calculated earliest arrival and latest arrival, the TT arrival window policing can be configured. If the slot time duration of the given virtual link cannot fit between the latest start time and the end of the candidate bin, method 1100 repeats at block 1102 with the next candidate bin in the sorted order.

Left Vs Right Justification

If two bins have the same or similar utilization, then the NST 300 can be configured to use either left justification or right justification to select the bin. Similar utilization can be defined as being within the same predetermined percentage of utilization. For example, the utilization level can be quantized in 10% quotas or ranges, such as 0-10%, 10-20% . . . 80-90%, 90-100%. If both bins fall within the same range of utilization, they are considered to have the same or similar utilization.

If the NST 300 is configured to use left justification, then bins which appear earlier on the global time line are selected prior to bins which appear later on the global time line. In some embodiments, the default configuration is to use left-justification. If the NST 300 is configured to use right justification, then bins which appear later on the global time line are selected before bins which appear earlier on the global time line.

Left vs right justification enables a system integrator to choose if a packet or message is more likely to remain in the producer host buffer (i.e. right justified and so network schedule chosen such that the packet arrives at the consumer just in time) or if the packet or message is more likely to remain in the consumer host buffer (i.e. left justified and so network schedule chose such that the packet leaves the producer buffer early and arrives at the consumer host early.) Thus, the use of left or right justification biases whether the virtual link spends the majority of its time in the single Tx ES buffer or the multiple Rx ES buffers. The left and right justification can be used to effect the amount of radiation exposure while the message is communicated from Tx ES to Rx ES.

In scheduling the sorted unscheduled virtual links, each unscheduled synchronization virtual link and TT virtual link is processed one at a time according to the sort order discussed above to find the first bin, using the sorted bin order discussed above, that completely accommodates within the bin the respective slot time of the given virtual link. If no bin completely accommodates the respective slot time, the given virtual link is considered unscheduled and the method 800 returns to block 806 to schedule the next virtual link.

Port Based Interference Management

Figure 12:
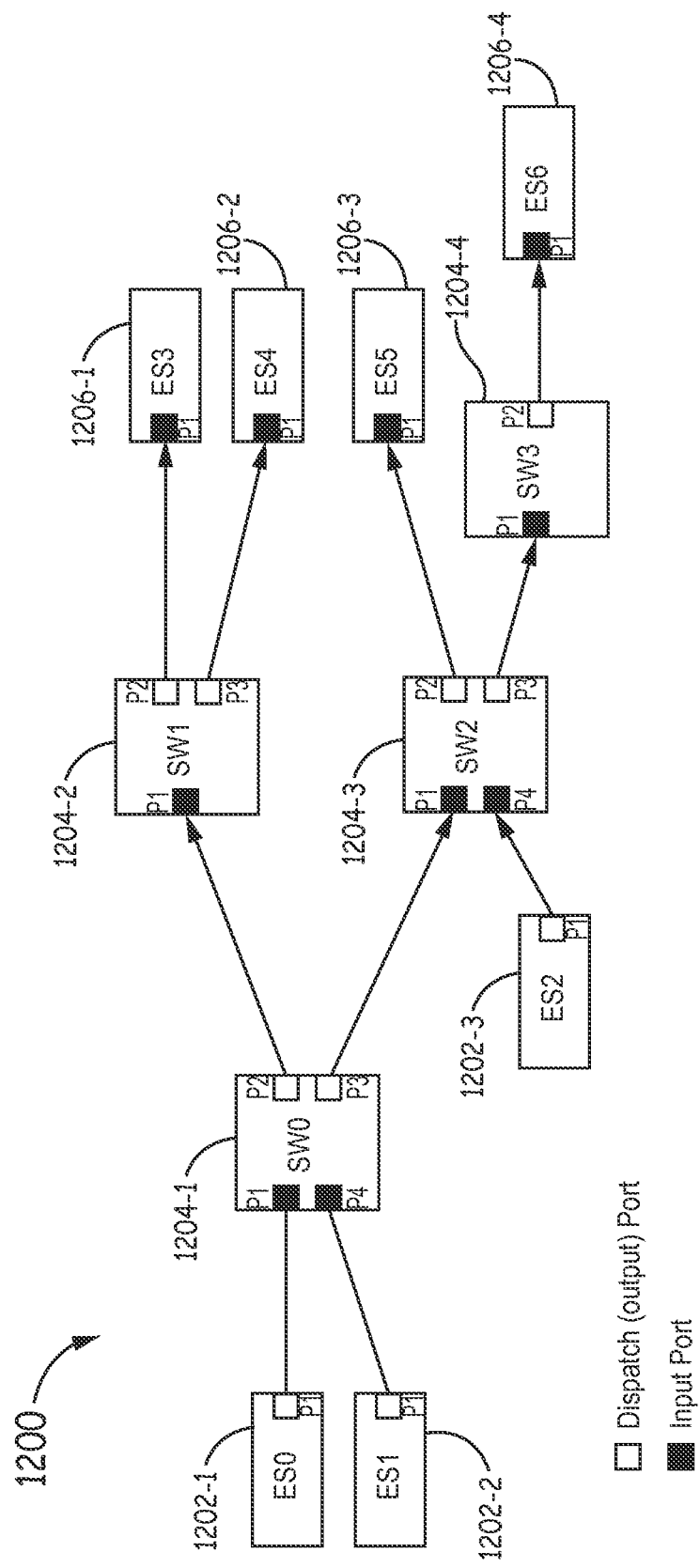
FIG. 12 is a block diagram of one embodiment of an exemplary network.

FIG. 12 is a block diagram of one embodiment of an exemplary network 1200 which illustrates calculation of interference at common dispatch ports for synchronization and TT virtual links based on the respective routing paths. As shown in FIG. 12, end stations 1202-1, 1202-2, and 1202-3 are transmission or transmitting end stations (Tx ES). Additionally, end stations 1206-1, 1206-2, 1206-3 and 1206-4 are receiving or reception end stations (Rx ES). The Tx ES 1202 are coupled to the Rx ES via switches 1204-1, 1204-2, 1204-3, and 1204-4.

Each Tx ES 1202 includes at least one dispatch port 1208, each Rx ES 1206 includes at least one input port 1210, and each switch 1204 includes at least one input port 1210 and at least one dispatch port 1208. For a scheduled virtual link, VL1, the producing host is Tx ES 1202-1 and the consuming hosts are Rx ES 1206-1, 1206-2 and 1206-3. Thus, the routing path from Tx ES 1202-1 to Rx ES 1206-1 for the virtual link VL1 is dispatch port P1 of Tx ES 1202-1 to input port P1 of switch 1204-1 to dispatch port P2 of switch 1204-1 to input port P1 of switch 1204-2 to dispatch port P2 of switch 1204-2 to input port P1 of Rx Es 1206-1. The routing path from Tx ES 1202-1 to Rx ES 1206-2 for the virtual link VL1 is dispatch port P1 of Tx ES 1202-1 to input port P1 of switch 1204-1 to dispatch port P2 of switch 1204-1 to input port P1 of switch 1204-2 to dispatch port P3 of switch 1204-2 to input port P1 of Rx Es 1206-2. The routing path from Tx ES 1202-1 to Rx ES 1206-3 for the virtual link VL1 is dispatch port P1 of Tx ES 1202-1 to input port P1 of switch 1204-1 to dispatch port P3 of switch 1204-1 to input port P1 of switch 1204-3 to dispatch port P2 of switch 1204-3 to input port P1 of Rx Es 1206-3.

In this example, there are 4 unscheduled virtual links, VL2, VL3, VL4, and VL5. The producing host for VL2 is Tx ES 1202-1 and the consuming host is Rx ES 1206-1. The producing host for VL3 is Tx ES 1202-2 and the consuming host is Rx ES 1206-2. The producing host for VL4 is Tx ES 1202-3 and the consuming host is Rx ES 1206-3. The producing host for VL5 is Tx ES 1202-3 and the consuming host is Rx ES 1206-4. For each of these exemplary unscheduled virtual links, comparison of the respective routing paths to the routing path of the scheduled VL1 identifies any common dispatch ports that are shared between the scheduled VL1 and one or more of the unscheduled virtual links. In some embodiments, VL1 is a virtual link corresponding to a first protocol, such as, but not limited to the AFDX protocol, and the unscheduled virtual links correspond to a second protocol, such as but not limited to the TTEthernet protocol, that is different from the first protocol.

For example, VL1 and VL2 have the following common dispatch ports: port P1 in Tx ES 1202-1, port P2 in switch 1204-1, and port P2 in switch 1204-2. The earliest interference between VL1 and VL2 is at port P1 of Tx ES 1202-1. VL1 and VL3 have the following common dispatch ports: port P2 in switch 1204-1 and port P3 in switch 1204-2. Thus, the earliest interference between VL1 and VL2 is at port P2 in switch 1204-1. VL1 and VL4 have dispatch port P2 in switch 1204-3 in common which is also the earliest interference between VL1 and VL2. VL1 and VL5 do not have any dispatch ports in common.

FIGS. 13A-13D illustrate various manners of scheduling TT virtual links in a common bin based on the common dispatch port interference from the example shown in FIG. 12. For example, FIG. 13A illustrates a pipelined approach where the earliest start time for VL4 is after the end of the slot time for VL1. This is because the earliest common dispatch interference occurs at the last switch dispatch port for VL1. FIG. 13B illustrates an overlaid approach where both VL1 and VL5 are scheduled with the same start time. VL1 and VL5 can overlap as they do not have any common dispatch ports. FIG. 13C illustrates a stacked and shifted approach where VL2 overlaps VL1, but the earliest start time for VL2 is delayed to start after the latest message transmission from the dispatch port of Tx ES 1202-1. This delay ensures that there is no interference between VL1 and VL2. FIG. 13D is also stacked and shifted. However, in FIG. 13D, the earliest start time for VL3 is delayed until after the latest message transmission for VL1 from the dispatch port P2 of switch 1204-1. In this manner, a message for VL3 will not be present at any of the common dispatch ports at the same time as a message for VL1.

The exemplary embodiments described above with respect to FIGS. 11, 12, and 13A-13D were described with respect to zero permitted interference for TT virtual links. However, in other embodiments, one or both of the following parameters can be configured in the NST 300 to permit a fixed level of interference for TT virtual links. The first parameter is maximum TT interference per scheduled TT virtual link. This parameter indicates the maximum number of scheduled TT virtual links that can interfere with each other in total end-to-end along the routing path for the given TT virtual link at any common dispatch port. In some embodiments, the default value for this parameter is zero, whereby no interference for each scheduled TT virtual link is permitted, as discussed above.

The second parameter is the maximum buffer depth at each Tx ES and switch. This parameter indicates how many scheduled TT virtual links can simultaneously coexist at the Tx ES dispatch port buffer or at a switch dispatch port buffer. In some embodiments, the default value is 1 which indicates zero interference, as discussed above, with at most 1 scheduled TT virtual link at any dispatch port buffer at any given time.

If the maximum TT interference is set to be greater than 0, then the slot duration (e.g. variable slot time discussed above) is increased for all TT virtual links by an additional shuffle time penalty equal to the shuffle time multiplied by the value of the maximum TT interference parameter. Thus, the TT virtual links have increased latency and jitter, but the latency and jitter is bounded and limited to a fixed value of the maximum TT interference parameter.

In addition, when the maximum TT interference is zero only one buffer needs to be reserved for transmission at the Tx ES and switch dispatch ports along all routing paths of the respective TT virtual link. However, when the maximum TT interference is greater than zero, a buffer depth parameter needs to be set for each Tx ES and switch dispatch port along all routing paths of the respective TT virtual link. Hence, each Tx Es and switch along a given TT virtual link routing path need to reserve additional buffers, but the number of buffers is bounded and limited to a fixed value of the maximum buffer depth parameter.

For the increased slot duration (variable slot time) of each TT virtual link, the NST 300 performs additional checks to see if interference constraints are met as it identifies the earliest respective start time that can be accommodated within a given bin for each respective TT virtual link. In particular, for each TT virtual link being scheduled, the NST 300 determines if an already scheduled TT virtual link's current number of interfering TT virtual links is less than the maximum TT interference parameter allowed for the scheduled TT virtual link, and if all the dispatch ports in common between the already scheduled TT virtual link and the TT virtual link being scheduled have less than the allowed maximum buffer depth. If the NST 300 determines that both of these conditions are met, then the NST 300 can determine a relatively earlier start time for the TT virtual link being scheduled by overlaying the TT virtual link being scheduled with the already scheduled TT virtual link, similar to what is shown and described with respect to FIG. 13B. In other words, the already scheduled TT virtual link and the TT virtual link being scheduled can start at the same time. Thus, the ability to schedule TT virtual links is improved because of the increased ability of the NST 300 to identify earlier start times. This provides the advantage of scheduling more TT virtual links which improves scalability of the NST 300.

Queuing Latencies

Queuing latencies are calculated for SCHRC virtual links and RC virtual links using a similar approach, as described below. For RC virtual links and BE flows, queuing latencies are computed on a per dispatch port basis at the respective Tx ES and each switch on the respective routing path (e.g. $1^{st}$ hop switch, $2^{nd}$ hop switch, etc.) Since dispatches of message for SCHRC virtual links are explicitly scheduled at the local Tx ES, queuing latencies for SCHRC virtual links are only computed at each switch on the routing path. In other words, there is no queuing latency at the Tx ES dispatch ports for SCHRC virtual links. Thus, queuing latencies for both SCHRC and RC virtual links are computed by the NST 300 on a per dispatch port basis at each switch on the routing path. BE flows are added to the slot time, discussed above, which indicates the worst case latencies seen end-to-end for the corresponding SCHRC virtual links, RC virtual links, and BE flows. If the computed slot time for a given SCHRC virtual link or an RC virtual link is not less than the period for that given virtual link, then the NST 300 outputs a report to a user indicating that the given virtual link is considered infeasible. The computed slot time for BE flows are also reported and may or may not be less than the period of the given BE flow. Hence, BE flows may or may not be feasible as there are no guaranteed latencies for BE flows, as discussed above.

Figure 15:
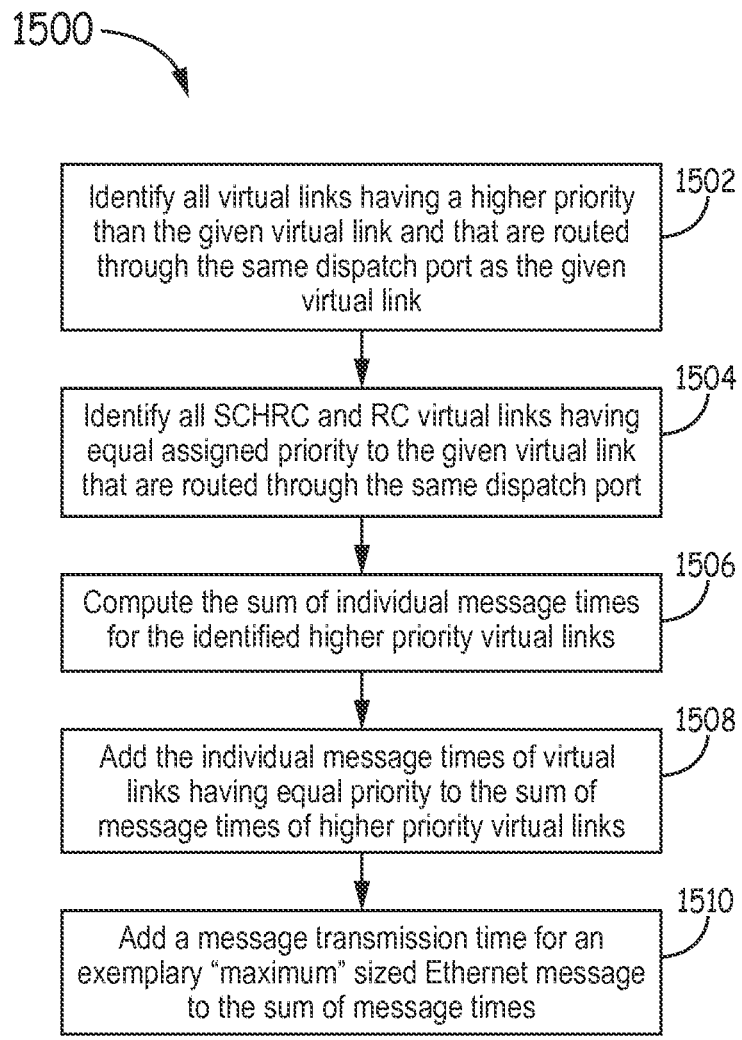
FIG. 15 is a flow chart depicting one embodiment of an exemplary method of computing queuing latencies for SCHRC and RC virtual links at a dispatch port.

FIG. 15 is a flow chart depicting one embodiment of an exemplary method 1500 of computing queuing latencies for SCHRC and RC virtual links at a dispatch port. At block 1502, all virtual links (i.e. Synchronization, TT, SCHRC, and RC) having a higher priority than the given virtual link, whose queuing latency is being computed, and that are routed through the same dispatch port as the given virtual link are identified. At block 1504, all SCHRC and RC virtual links having equal assigned priority to the given virtual link, whose queuing latency is being computed, that are routed through the same dispatch port are identified.

At block 1506, the sum of individual message times (including headers and IFG, etc.) for the identified higher priority virtual links is computed. In computing the sum, the message times of higher priority virtual links having a rate that is faster than the given virtual link (i.e. a period that is smaller than the period of the virtual link whose latency is being computed) are included multiple times by a factor indicated by the ratio of the respective rates. For example, if a higher priority virtual link has a rate that is twice as fast (e.g. half the period) of the given virtual link, then the sum of the message times includes the message time of the faster, higher priority virtual link twice.

At block 1508, the individual message times (including headers and IFG, etc.) of virtual links having equal priority to the given virtual link are added to the sum of message times of higher priority virtual links. However, the individual message times of virtual links having equal priority are only added once regardless of the relative rate as compared to the virtual link whose latency is being computed.

At block 1510, a message transmission time for an exemplary "maximum" sized Ethernet message is added to the sum of message times computed above. The maximum size can be determined a priori based on system settings or can be a maximum size expected to be encountered. This hypothetical maximum sized Ethernet message accounts for a scenario where the message of the given virtual link arrives at the respective dispatch port immediately after a lower priority message has begun transmission. The value computed at block 1510 is the worst case wait time of the given virtual link in the queue of the respective dispatch port. Hence, this is the queuing latency of the given virtual link at the respective dispatch port.

Buffer Management

Figure 21:
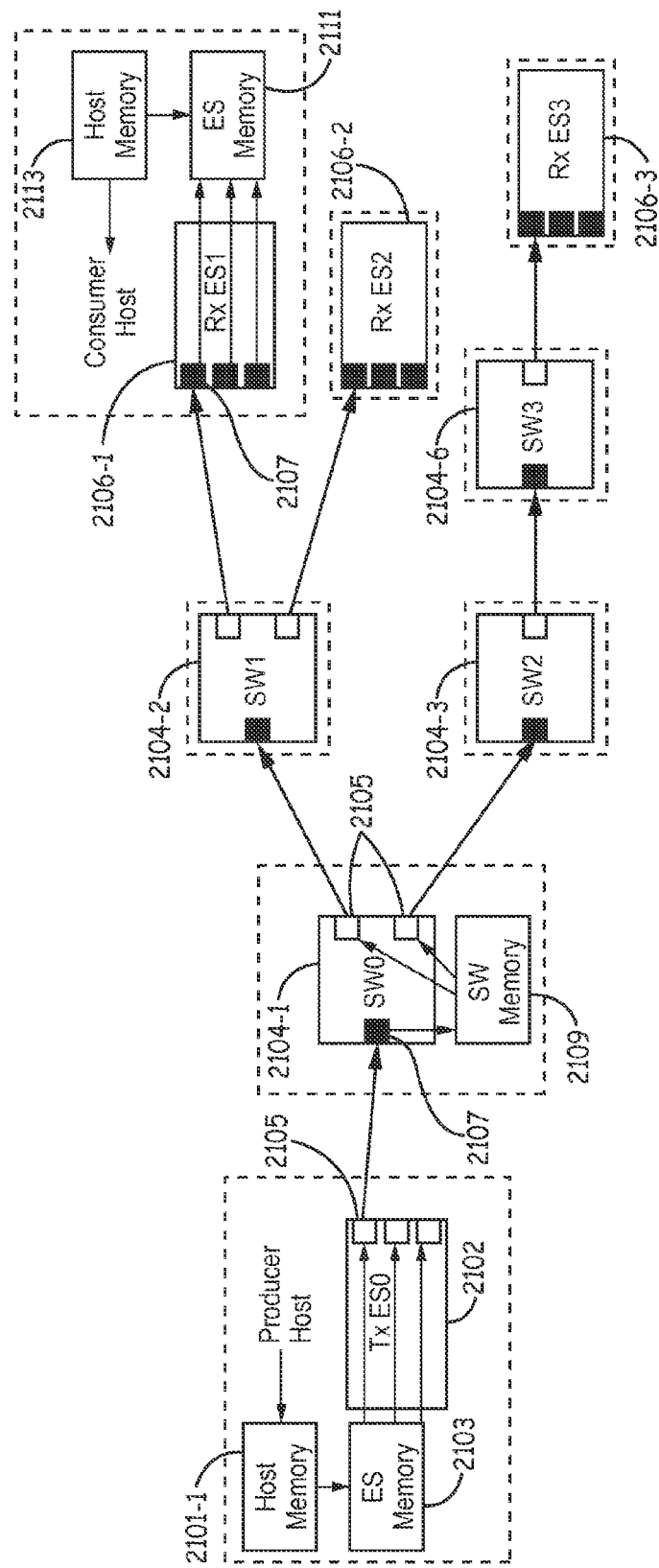
FIG. 21 is a block diagram depicting a buffer centric view of one embodiment of an exemplary network plane.

The NST 300 also computes buffer feasibility for each input port and dispatch port of each end station for each bin of the global timeline. Feasibility refers to whether or not the end station has the capacity to meet the buffer requirements for the given bin. For example, FIG. 21 depicts an exemplary buffer centric view of one embodiment of an exemplary network plane. It is to be understood that although only one network plane is shown in FIG. 21, for purposes of explanation, multiple network planes can be implemented as discussed above.

In FIG. 21, the arrows depict the Message/Packet traversal path through Buffers/Memory. For example, a message from a producer host traverses through a host memory 2101 to a buffer in the Tx ES memory 2103 reserved by the NST. The message/packet is then output from the Tx ES 2102 via an egress or dispatch port 2105. The message/packet is received at an ingress port 2107 of a switch 2104-1 and is placed in a buffer in the switch memory 2109. The message/packet is then dispatched via the dispatch ports 2105 of the switch 2104-1. The message/packet is processed in switches 2104-2 . . . 2104-4 similar to switch 2104-1 until the message/packet is received at an ingress port 2107 of one or more Rx ES 2106. The Rx ES 2106 places the message/packet in a buffer of the Rx ES memory 2111 reserved by the NST. The message/packet is then delivered to a host memory 2113 of the corresponding consumer host 2113 it is consumed or processed by the consumer host.

In particular, for each feasible/scheduled egress virtual link that is transmitted from a given end station (Tx ES), the NST 300 reserves one exclusive buffer for each synchronization virtual link with the message payload size (exactly 46 bytes in some embodiments) plus Ethernet header and Frame Check Sequence (FCS) (18 bytes of Ethernet header/FCS in some embodiments for a total of 64 bytes). In addition, for each TT virtual link, the NST 300 reserves one exclusive buffer with the message payload size plus Ethernet header and FCS. For each SCHRC virtual link, the NST 300 reserves one exclusive buffer with the message payload size plus Ethernet header and FCS. For each RC virtual link, the NST 300 reserves one exclusive buffer with the message payload size plus Ethernet header and FCS. It should be noted that even though a Tx ES may be configured to transmit over multiple network planes, as discussed above, only a single buffer for each egress virtual link is reserved in some embodiments. In such embodiments, the single buffer is used to transmit the message redundantly across the multiple network planes for the given virtual link via the corresponding dispatch ports at the Tx ES.

For each feasible/scheduled input or ingress virtual link received at the given end station (i.e. Rx ES), the NST 300 reserves one or more exclusive input buffers for each synchronization virtual link with the message payload size plus Ethernet header and FCS. The number of exclusive input buffers reserved depends on the number of input ports or network planes applicable to that synchronization virtual link.

For TT virtual links, the number of exclusive input buffers that are reserved depends on the number of network planes applicable to the TT virtual links, similar to the synchronization virtual links discussed above. In addition, the number of input buffers for TT virtual links depends on the maximum Tx ES buffer depth and the maximum switch buffer depth discussed above. That is, if the maximum Tx ES and switch buffer depth is set to 1, then only one exclusive input buffer per network plane is reserved for all TT virtual links received at that input port. The exclusive input buffer is for a maximum size TT virtual link expected to be received including the message payload size plus Ethernet header and FCS. If the maximum Tx ES and switch buffer depth is 2, then 2 exclusive input buffers are reserved per network plane and so on.

For each SCHRC virtual link, the NST 300 reserves one exclusive input buffer per network plane or per input port applicable to the respective SCHRC virtual link with the message payload size plus Ethernet header and FCS. For each RC virtual link, the NST 300 reserves one exclusive input buffer per network plane or per input port applicable to the respective RC virtual link with the message payload size plus Ethernet header and FCS. For each end station, the NST 300 determines if the number of egress and/or input buffers reserved at the respective end station exceeds the hardware capacity of the respective end station. If the number of reserved buffers exceeds the hardware capacity of the respective end station, the NST 300 reports the buffer infeasibility to a user. If the number of reserved buffers does not exceed the hardware capacity of the respective end station, then the NST 300 delegates any remaining unused buffers for BE flows. In other words, the BE traffic flows get what is remaining once critical traffic or higher priority traffic is accommodated.

The NST 300 also manages and reserves buffers at each switch along a routing path from a Tx ES to a Rx ES. Each switch can have multiple ports. For example, in some embodiments, each switch can have up to 12 ports. Synchronization, TT, SCHRC, and RC virtual links, as well as BE flows, can be received at any one of the ports in each switch. Additionally, each BE flow and virtual link can be output on up to all of the ports of the respective switch. For TT virtual links, the NST 300 generates configuration tables that direct each switch to buffer and output the Ethernet frames corresponding to a respective TT virtual link as an RC virtual link according to one of the TT configuration options discussed above.

For RC virtual links, Ethernet frames received at an input port are held in an input buffer until the frame is dispatched from all the routed output ports. In other words, the Ethernet frames are held until the last routed output port completes and then the buffer is released. With respect to the switches, the SCHRC virtual links are handled as RC virtual links since the SCHRC traffic class is a concept utilized by the NST 300, but is not distinguished from RC traffic by the switches. Thus, for TT, RC, and SCHRC virtual links, the buffers are held on the input side rather than on the output side. Synchronization frames, however, may be received at an input port of the switch or may originate independently at the switch. Thus, synchronization frames can be held in buffers at the input or the output side.

For each switch on the network, the NST 300 reserves one exclusive buffer for each scheduled egress/output synchronization virtual link per output port for the message payload size plus Ethernet header and FCS. Additionally, for each switch, the NST 300 reserves one exclusive buffer for each scheduled ingress synchronization virtual link for the message payload size plus Ethernet header and FCS. For each TT virtual link at each switch, the NST 300 reserves one exclusive buffer for the message payload size plus Ethernet header and FCS. Similarly, for each SCHRC and RC virtual link at each switch, the NST 300 reserves one respective exclusive buffer for the respective message payload size plus Ethernet header and FCS.

For each switch, the NST 300 determines if the number of buffers reserved for each scheduled egress/ingress virtual link at the respective switch exceeds the hardware capacity of the respective switch. If the number of reserved buffers exceeds the hardware capacity of the respective switch, the NST 300 reports the buffer infeasibility to a user. If the number of reserved buffers does not exceed the hardware capacity of the respective switch, then the NST 300 delegates any remaining unused buffers for BE flows. In other words, the BE traffic flows get what is remaining once critical traffic or higher priority traffic is accommodated.

Virtual Link Fragmentation

In some embodiments, the NST 300 typically schedules or configures one message per respective period for TT, RC, and SCHRC virtual links. However, in other embodiments, the NST 300 is configured to fragment a virtual link message payload. For example, in some situations, the payload size of the virtual link exceeds the maximum frame size for the network (e.g. a message size greater than 1500 bytes which is the maximum sized Ethernet payload). In such situations, the NST 300 splits the message payload into fragments that are each less than the maximum frame size. The fragments are sent via the same virtual link to the Rx ES where they are re-assembled.

The NST 300 can be configured to use one or both of the following approaches to fragment a virtual link message. In the first approach, the NST 300 samples the given virtual link message and schedules or configures the virtual link to spread it across equal periods. For example, the NST 300 can split an exemplary virtual link with period P and message size M into a predetermined number, 'k', pieces: $M_1, M_2, \ldots, M_k$. Thus, the sum of the k pieces equals the total message size, M ($\Sigma M_i = M$). For RC virtual links, the NST 300 configures the virtual link as an RC virtual link having a period P', which is equal to the total period divided by the number of pieces (i.e. P/k), and a message size M', which is equal to the size of the largest individual message piece.

For SCHRC virtual links and TT virtual links, the NST 300 schedules the virtual links as SCHRC or TT virtual links, respectively, with respective harmonic periods from the existing set of available schedule periods P' that are smaller than or equal to the original period, P, divided by the number of message pieces (i.e. P'<=P/k). The NST 300 also schedules the virtual links with message size M' that is equal to the size of the largest individual message piece. In other words, the NST 300 finds the fastest rate/smallest period from the existing harmonic schedules that meets the sampling rate/period of the fragmented virtual link.

Figure 16:
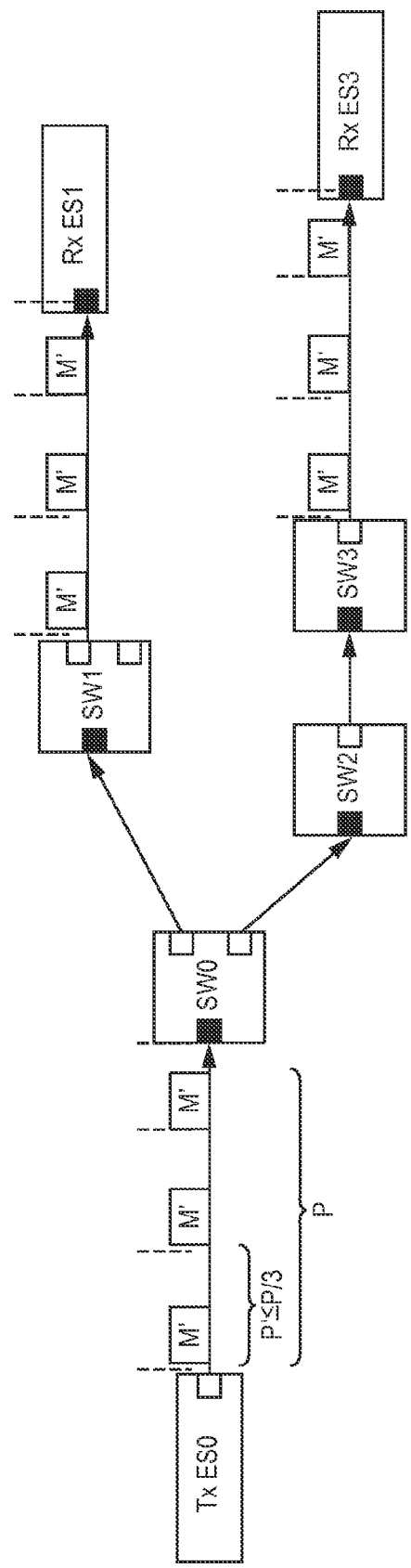
FIG. 16 illustrates one exemplary embodiment of scheduling a virtual link message across equal periods.

An example of the first approach is depicted in FIG. 16. The first approach is a straightforward approach to sample at a faster rate and assign each message fragment, $M_i$, to a smaller period. However, because the largest message piece is used to determine the message size of each configured/scheduled period, as well a potentially smaller period than needed, bandwidth can be wasted for TT virtual links as TT virtual links are globally scheduled. SCHRC virtual link do not experience as much wasted bandwidth as SCHRC virtual links are locally scheduled.

The second approach is only applicable to TT virtual links that are globally scheduled. In the second approach the NST 300 divides the TT virtual link message into the k pieces with message size M', as discussed above with respect to the first approach. However, in the second approach, the NST 300 increases the variable slot time for the given TT virtual link to account for the number k of message pieces or fragments each with a size M' plus the Ethernet header and interframe gap (IFG) for the given TT virtual link. The NST 300 then schedules the given fragmented TT virtual link according to one of the scheduling paradigms for TT virtual links discussed above using the modified slot time. After scheduling the TT virtual link, the NST 300 creates k number of schedule entries back-to-back at the Tx ES schedule table starting with the modified slot time scheduled from the global scheduling algorithm and transmission time for k fragments of size $M_i$ plus the Ethernet header and IFG.

Figure 17:
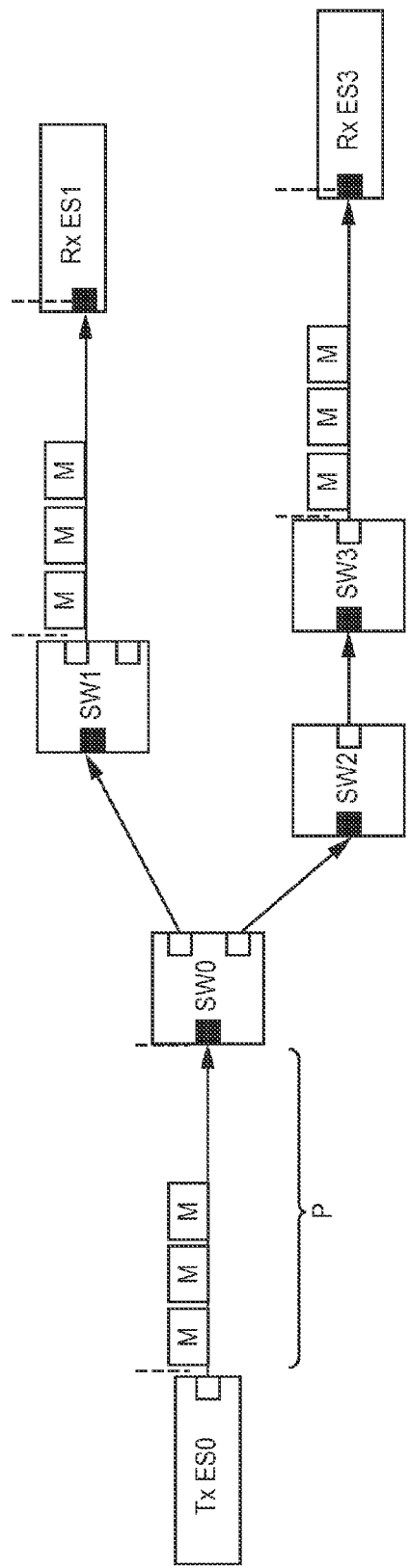
FIG. 17 illustrates another exemplary embodiment of scheduling a virtual link message.

The NST 300 also generates configuration tables for the Tx ES and each switch and Rx ES in the path of the given fragmented TT virtual link to implement the back-to-back burst of message fragments. In particular, the NST 300 increases the buffer usage for k fragments of size $M_i$ for the given TT virtual link at the Tx ES and at each Rx ES. The NST 300 also disables the TT arrival window policing if the Tx ES is high integrity. For standard integrity Tx ES, the NST 300 sets the BAG window policing treating the fragmented TT virtual link as an RC virtual link with priority RC6 at the input with a BAG period set to the duration of a total message size M. Additionally, the NST 300 configures the fragmented TT virtual link as an RC virtual link with priority RC 6 at each Rx ES instead of as a TT virtual link. The NST 300 also configured the RC redundancy management and integrity checking for the fragmented TT virtual link at each Rx ES. This approach reduces the wasted bandwidth as compared to the first approach, but increases the buffer usage. An example of the second approach for an exemplary TT virtual link is depicted in FIG. 17.

Cooperative Scheduling for Test Port Management

Figure 20:
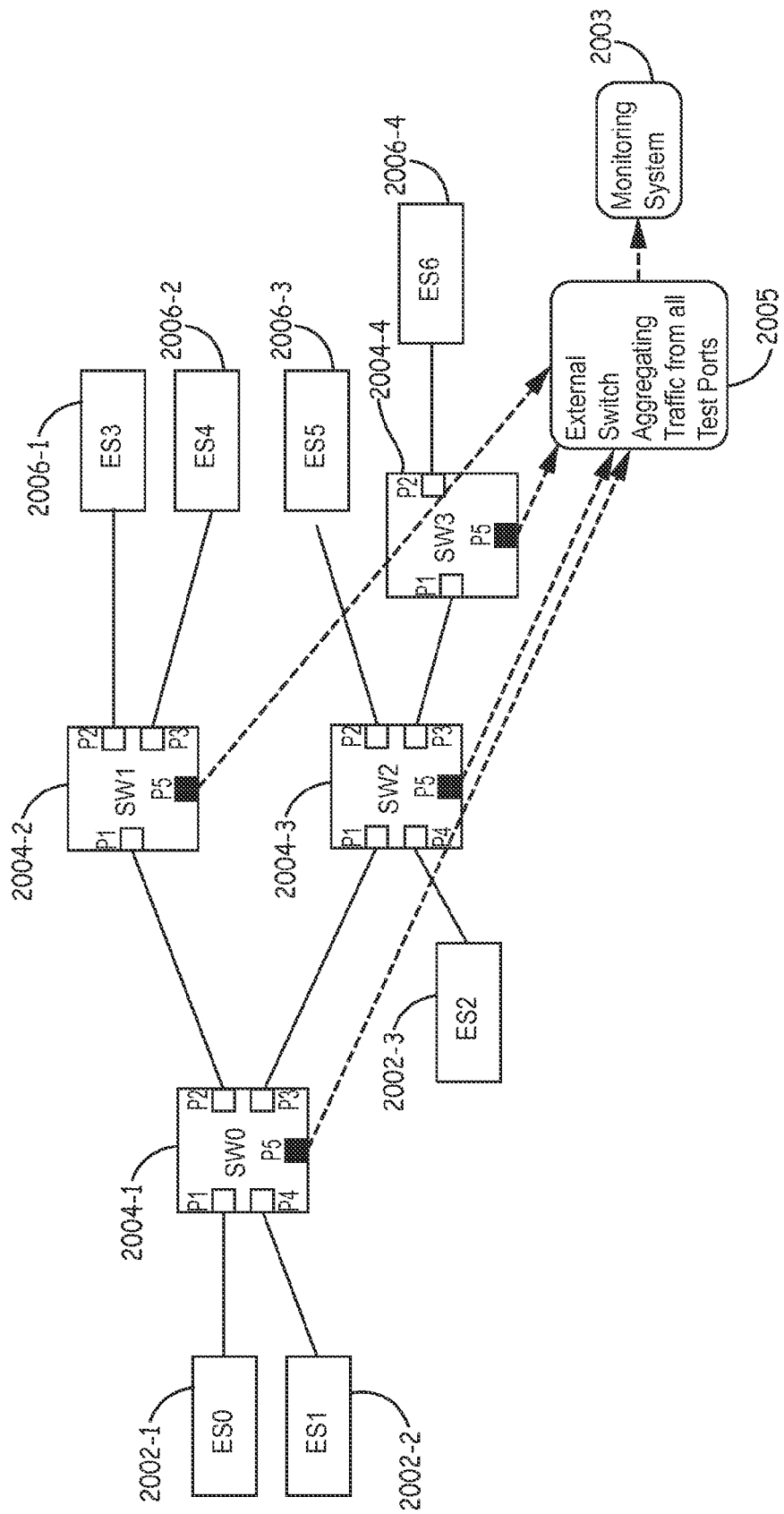
FIG. 20 is a block diagram of one embodiment of an exemplary network.

In some embodiments, a mechanism is desired to monitor traffic in order to perform diagnostics on the network. For example, TT, RC, SCHRC, and all critical traffic may be monitored to detect any problems or faults. The NST 300 is configured to characterize a port, labelled P5 in FIG. 20, in each switch 2004 as a test port and configure the test port to prevent serializing the schedule. For example, if a monitoring system is on the actual network, the traffic would typically need to be serialized through a switch to prevent the messages from interfering at the test port. This has the effect of spreading the schedule.

However, in this embodiment, the NST 300 generates a configuration table to enable the test port without serializing the traffic. In particular, the NST 300 excludes the test port P5 in each switch 2004 from the dispatch/output port consideration in the interference calculation, discussed above, during global scheduling so that the TT schedule is not serialized. This avoids spreading the TT virtual links since monitored TT virtual links all share the test port P5 as a common dispatch/output port.

Additional exclusive buffers are not needed to be reserved for the test port P5 since synchronization virtual links, TT virtual links, SHCRC virtual links, and RC virtual links at a high level flow through each switch as RC7, RC6, RC5 to RC0, and RC5 to RC0, respectively (i.e. each flows as an RC virtual link through each switch). The NST 300 can be configured to receive input from a system integrator specifying which virtual link (Synchronization, TT, SCHRC, and/or RC) should be monitored. For those virtual links being monitored, the NST 300 modifies the schedule and configuration table for each switch to route the virtual link to the test port P5 in addition to the other corresponding dispatch/output ports. In this embodiment, a monitoring system 2003 is coupled to the test ports of each switch 2004 via a separate switch 2005 which aggregates the traffic from all the switches. In other embodiments, the monitoring system 2003 is connected to each test port directly.

EXAMPLE EMBODIMENTS

Example 1 includes a method of scheduling communications in a network, the method comprising: scheduling transmission of virtual links pertaining to a first traffic class on a global schedule to coordinate transmission of the virtual links pertaining to the first traffic class across all transmitting end stations on the global schedule; and scheduling transmission of each virtual link pertaining to a second traffic class on a local schedule of the respective transmitting end station from which each respective virtual link pertaining to the second traffic class is transmitted such that transmission of each virtual link pertaining to the second traffic class is coordinated only at the respective end station from which each respective virtual link pertaining to the second traffic class is transmitted.

Example 2 includes the method of Example 1, further comprising: accounting for the transmission of each virtual link pertaining to a third traffic class, wherein dispatch times from the end systems are not scheduled but whose latency is guaranteed and a fourth traffic class wherein the dispatch times from the end systems are not scheduled and whose latency is not guaranteed; computing a queuing latency for a given virtual link at each respective dispatch port along a routing path for the given virtual link, wherein computing the queuing latency at each respective dispatch port comprises: identifying all virtual links having a higher priority than the given virtual link and that are routed through the same respective dispatch port as the given virtual link; identifying all virtual links having equal priority to the given virtual link and that are routed through the same respective dispatch port as the given virtual link; computing a first sum of individual message times for the identified higher priority virtual links, wherein the respective message time of each identified higher priority virtual link is multiplied by a factor indicated by a ratio of the message rate of each respective higher priority virtual link to the message rate of the given virtual link; computing a second sum of individual message times for the identified equal priority virtual links, wherein the respective message time of each equal priority virtual link is not multiplied by a factor regardless of the message rate of the respective equal priority virtual link; wherein the queuing latency at the respective dispatch port is the sum of the first sum, the second sum, and a pre-determined message transmission time representing a maximum sized message, wherein the queuing latency at each node is one of a component delay of an end to end latency defined by slot times for each of the four traffic classes.

Example 3 includes the method of any of Examples 1-2, further comprising: splitting a payload of a message corresponding to a given virtual link into a plurality of fragments, each fragment being smaller than a maximum frame size; and sending each of the plurality of fragments in a respective period of the given virtual link.

Example 4 includes the method of any of Examples 1-3, further comprising: dividing a payload of a message corresponding to a given virtual link that pertains to the first traffic class into a plurality of fragments, each fragment being smaller than a maximum frame size; increasing a slot time for the given virtual link to account for the plurality of fragments; generating a plurality of schedule entries back-to-back on the global schedule based on the transmission time for the plurality of fragments.

Example 5 includes the method of any of Examples 1-4, further comprising: calculating a respective variable slot time duration for each of the virtual links pertaining to the first traffic class and for each of the virtual links pertaining to the second traffic class.

Example 6 includes the method of any of Examples 1-5, further comprising: calculating a green zone for each respective virtual link pertaining to the first traffic class based on timing information for the respective virtual link's producing host and consuming hosts, wherein the green zone specifics a valid time on the global schedule within which the respective virtual link is to be scheduled; ensuring that virtual link end to end latency fits within the calculated green zone.

Example 7 includes the method of Example 6, wherein calculating the green zone for each respective virtual link pertaining to the first traffic class comprises one of: calculating the green zone for the respective virtual link such that the green zone begins after a latest consumer keep-out zone for the respective virtual link and ends prior to the beginning of a producer keep-out zone for the respective virtual link; or calculating the green zone for the respective virtual link such that the green zone begins after the producer keep-out zone for the respective virtual link and ends prior to the beginning of the earliest consumer keep-out zone.

Example 8 includes the method of any of Examples 1-7, further comprising: enabling a reserve media option for one or more of the virtual links pertaining to the first traffic class, wherein the reserve media option block transmission of unscheduled frames for a predetermined period of time prior to a respective scheduled dispatch of the one or more virtual links pertaining to the first traffic class.

Example 9 includes the method of any of Examples 1-8, further comprising: sorting the virtual links pertaining to the second traffic class based on one or more attributes; dividing the sorted virtual links pertaining to the second traffic class into approximately equal sized groups based on the number of priorities available for the virtual links pertaining to the second traffic class; and assigning each group of virtual links to one of the priorities available for the virtual links pertaining to the second traffic class.

Example 10 includes a program product comprising a processor-readable medium on which program instructions are embodied, wherein the program instructions are configured, when executed by at least one programmable processor, to cause the at least one programmable processor to: schedule transmission of virtual links pertaining to a first traffic class on a global schedule to coordinate transmission of the virtual links pertaining to the first traffic class across all transmitting end stations on the global schedule; and schedule transmission of each virtual link pertaining to a second traffic class on a local schedule of the respective transmitting end station from which each respective virtual link pertaining to the second traffic class is transmitted such that transmission of each virtual link pertaining to the second traffic class is coordinated only at the respective end station from which each respective virtual link pertaining to the second traffic class is transmitted.

Example 11 includes the program product of Example 10, wherein the program instructions are further configured to cause the at least one programmable processor to: account for the transmission of each virtual link pertaining to a third traffic class, wherein dispatch times from the end systems are not scheduled but whose latency is guaranteed and a fourth traffic class wherein the dispatch times from the end systems are not scheduled and whose latency is not guaranteed; compute a queuing latency for a given virtual link at each respective dispatch port along a routing path for the given virtual link, wherein computing the queuing latency at each respective dispatch port comprises: identify all virtual links having a higher priority than the given virtual link and that are routed through the same respective dispatch port as the given virtual link; identify all virtual links having equal priority to the given virtual link and that are routed through the same respective dispatch port as the given virtual link; compute a first sum of individual message times for the identified higher priority virtual links, wherein the respective message time of each identified higher priority virtual link is multiplied by a factor indicated by a ratio of the message rate of each respective higher priority virtual link to the message rate of the given virtual link; compute a second sum of individual message times for the identified equal priority virtual links, wherein the respective message time of each equal priority virtual link is not multiplied by a factor regardless of the message rate of the respective equal priority virtual link; wherein the queuing latency at the respective dispatch port is the sum of the first sum, the second sum, and a pre-determined message transmission time representing a maximum sized message, wherein the queuing latency at each node is one of a component delay of an end to end latency defined by slot times for each of the four traffic classes.

Example 12 includes the program product of any of Examples 10-11, wherein the program instructions are further configured to cause the at least one programmable processor to: split a payload of a message corresponding to a given virtual link into a plurality of fragments, each fragment being smaller than a maximum frame size; and send each of the plurality of fragments in a respective period of the given virtual link.

Example 13 includes the program product of any of Examples 10-12, wherein the program instructions are further configured to cause the at least one programmable processor to: divide a payload of a message corresponding to a given virtual link that pertains to the first traffic class into a plurality of fragments, each fragment being smaller than a maximum frame size; increase a slot time for the given virtual link to account for the plurality of fragments; generate a plurality of schedule entries back-to-back on the global schedule based on the transmission time for the plurality of fragments.

Example 14 includes the program product of any of Examples 10-13, wherein the program instructions are further configured to cause the at least one programmable processor to: calculate a respective variable slot time duration for each of the virtual links pertaining to the first traffic class and for each of the virtual links pertaining to the second traffic class.

Example 15 includes the program product of any of Examples 10-14, wherein the program instructions are further configured to cause the at least one programmable processor to: calculate a green zone for each respective virtual link pertaining to the first traffic class based on timing information for the respective virtual link's producing host and consuming hosts, wherein the green zone specifies a valid time on the global schedule within which the respective virtual link is to be scheduled; ensuring that virtual link end to end latency fits within the calculated green zone.

Example 16 includes the program product of any of Examples 10-15, wherein the program instructions are further configured to cause the at least one programmable processor to: enable a reserve media option for one or more of the virtual links pertaining to the first traffic class, wherein the reserve media option block transmission of unscheduled frames for a predetermined period of time prior to a respective scheduled dispatch of the one or more virtual links pertaining to the first traffic class.

Example 17 includes the program product of any of Examples 10-16, wherein the program instructions are further configured to cause the at least one programmable processor to: sort the virtual links pertaining to the second traffic class based on one or more attributes; divide the sorted virtual links pertaining to the second traffic class into approximately equal sized groups based on the number of priorities available for the virtual links pertaining to the second traffic class; and assign each group of virtual links to one of the priorities available for the virtual links pertaining to the second traffic class.

Example 18 includes a method of scheduling communications, the method comprising: scheduling transmission of virtual links pertaining to a first traffic class on a global schedule to coordinate transmission of the virtual links pertaining to the first traffic class across all transmitting end stations on the global schedule; and scheduling transmission of each virtual link pertaining to a second traffic class on a local schedule of the respective transmitting end station from which each respective virtual link pertaining to the second traffic class is transmitted such that transmission of each virtual link pertaining to the second traffic class is coordinated only at the respective end station from which each respective virtual link pertaining to the second traffic class is transmitted; wherein scheduling transmission of virtual links pertaining to the first traffic class comprises calculating a respective variable slot time duration for each of the virtual links pertaining to the first traffic class and for each of the virtual links pertaining to the second traffic class; and wherein scheduling transmission of each virtual link pertaining to the second traffic class comprises: sorting the virtual links pertaining to the second traffic class based on one or more attributes; dividing the sorted virtual links pertaining to the second traffic class into approximately equal sized groups based on the number of priorities available for the virtual links pertaining to the second traffic class; and assigning each group of virtual links to one of the priorities available for the virtual links pertaining to the second traffic class.

Example 19 includes the method of Example 18, further comprising: account for the transmission of each virtual link pertaining to a third traffic class, wherein dispatch times from the end systems are not scheduled but whose latency is guaranteed and a fourth traffic class wherein the dispatch times from the end systems are not scheduled and whose latency is not guaranteed; computing a queuing latency for a given virtual link at each respective dispatch port along a routing path for the given virtual link, wherein computing the queuing latency at each respective dispatch port comprises: identifying all virtual links having a higher priority than the given virtual link and that are routed through the same respective dispatch port as the given virtual link; identifying all virtual links having equal priority to the given virtual link and that are routed through the same respective dispatch port as the given virtual link; computing a first sum of individual message times for the identified higher priority virtual links, wherein the respective message time of each identified higher priority virtual link is multiplied by a factor indicated by a ratio of the message rate of each respective higher priority virtual link to the message rate of the given virtual link; computing a second sum of individual message times for the identified equal priority virtual links, wherein the respective message time of each equal priority virtual link is not multiplied by a factor regardless of the message rate of the respective equal priority virtual link; wherein the queuing latency at the respective dispatch port is the sum of the first sum, the second sum, and a pre-determined message transmission time representing a maximum sized message, wherein the queuing latency at each node is one of a component delay of an end to end latency defined by slot times for each of the four traffic classes.

Example 20 includes the method of any of Examples 18-19, further comprising: splitting a payload of a message corresponding to a given virtual link into a plurality of fragments, each fragment being smaller than a maximum frame size; and sending each of the plurality of fragments in a respective period of the given virtual link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of scheduling communications in a network, the method comprising:
   scheduling transmission of virtual links pertaining to a first traffic class on a global schedule to coordinate transmission of the virtual links pertaining to the first traffic class across all transmitting end stations on the global schedule; and
   scheduling transmission of each virtual link pertaining to a second traffic class on a local schedule of a respective transmitting end station in the transmitting end stations from which each respective virtual link pertaining to the second traffic class is transmitted such that transmission of each virtual link pertaining to the second traffic class is coordinated only at the respective end station from which the each respective virtual link pertaining to the second traffic class is transmitted, wherein a traffic class is defined by local versus global scheduling time requirements, delay and latency guarantee requirements, and synchronization control traffic constraints.

2. The method of claim 1, further comprising:
   accounting for the transmission of each virtual link pertaining to a third traffic class, wherein dispatch times from the end stations are not scheduled but whose latency is guaranteed and a fourth traffic class wherein the dispatch times from the end systems are not scheduled and whose latency is not guaranteed;
   computing a queuing latency for a given virtual link at each respective dispatch port along a routing path for the given virtual link, wherein computing the queuing latency at each respective dispatch port comprises:
   identifying all virtual links having a higher priority than the given virtual link and that are routed through the same respective dispatch port as the given virtual link;
   identifying all virtual links having equal priority to the given virtual link and that are routed through the same respective dispatch port as the given virtual link;
   computing a first sum of individual message times for the identified higher priority virtual links, wherein a respective message time of each identified higher priority virtual link is multiplied by a factor indicated by a ratio of the message rate of each respective higher priority virtual link to the message rate of the given virtual link;
   computing a second sum of individual message times for the identified equal priority virtual links, wherein the respective message time of each equal priority virtual link is not multiplied by a factor regardless of the message rate of the respective equal priority virtual link;
   wherein the queuing latency at the respective dispatch port is the sum of the first sum, the second sum, and a pre-determined message transmission time representing a maximum sized message, wherein the queuing latency at each node is one of a component delay of an end to end latency defined by slot times for each of the four traffic classes.

3. The method of claim 1, further comprising:
splitting a payload of a message corresponding to a given virtual link into a plurality of fragments, each fragment being smaller than a maximum frame size; and
sending each of the plurality of fragments in a respective period of the given virtual link.

4. The method of claim 1, further comprising:
dividing a payload of a message corresponding to a given virtual link that pertains to the first traffic class into a plurality of fragments, each fragment being smaller than a maximum frame size;
increasing a slot time for the given virtual link to account for the plurality of fragments;
generating a plurality of schedule entries back-to-back on the global schedule based on the transmission time for the plurality of fragments.

5. The method of claim 1, further comprising:
calculating a respective variable slot time duration for each of the virtual links pertaining to the first traffic class and for each of the virtual links pertaining to the second traffic class.

6. The method of claim 1, further comprising:
calculating a green zone for each respective virtual link pertaining to the first traffic class based on timing information for the respective virtual link's producing host and consuming hosts, wherein the green zone specifics a valid time on the global schedule within which the respective virtual link is to be scheduled;
ensuring that virtual link end to end latency fits within the calculated green zone.

7. The method of claim 6, wherein calculating the green zone for each respective virtual link pertaining to the first traffic class comprises one of:
calculating the green zone for the respective virtual link such that the green zone begins after a latest consumer keep-out zone for the respective virtual link and ends prior to the beginning of a producer keep-out zone for the respective virtual link; or
calculating the green zone for the respective virtual link such that the green zone begins after the producer keep-out zone for the respective virtual link and ends prior to the beginning of the earliest consumer keep-out zone.

8. The method of claim 1, further comprising:
enabling a reserve media option for one or more of the virtual links pertaining to the first traffic class, wherein the reserve media option block transmission of unscheduled frames for a predetermined period of time prior to a respective scheduled dispatch of the one or more virtual links pertaining to the first traffic class.

9. The method of claim 1, further comprising:
sorting the virtual links pertaining to the second traffic class based on one or more attributes;
dividing the sorted virtual links pertaining to the second traffic class into approximately equal sized groups based on the number of priorities available for the virtual links pertaining to the second traffic class; and
assigning each group of virtual links to one of the priorities available for the virtual links pertaining to the second traffic class.

10. A program product comprising a non-transitory processor-readable medium on which program instructions are embodied, wherein the program instructions are configured, when executed by at least one programmable processor, to cause the at least one programmable processor to:
schedule transmission of virtual links pertaining to a first traffic class on a global schedule to coordinate transmission of the virtual links pertaining to the first traffic class across all transmitting end stations on the global schedule; and
schedule transmission of each virtual link pertaining to a second traffic class on a local schedule of a respective transmitting end station in the transmitting end stations from which each respective virtual link pertaining to the second traffic class is transmitted such that transmission of each virtual link pertaining to the second traffic class is coordinated only at the respective end station from which the each respective virtual link pertaining to the second traffic class is transmitted, wherein a traffic class is defined by local versus global scheduling time requirements, delay and latency guarantee requirements, and synchronization control traffic constraints.

11. The program product of claim 10, wherein the program instructions are further configured to cause the at least one programmable processor to:
account for the transmission of each virtual link pertaining to a third traffic class, wherein dispatch times from the end stations are not scheduled but whose latency is guaranteed and a fourth traffic class wherein the dispatch times from the end systems are not scheduled and whose latency is not guaranteed;
compute a queuing latency for a given virtual link at each respective dispatch port along a routing path for the given virtual link, wherein computing the queuing latency at each respective dispatch port comprises:
identify all virtual links having a higher priority than the given virtual link and that are routed through the same respective dispatch port as the given virtual link;
identify all virtual links having equal priority to the given virtual link and that are routed through the same respective dispatch port as the given virtual link;
compute a first sum of individual message times for the identified higher priority virtual links, wherein a respective message time of each identified higher priority virtual link is multiplied by a factor indicated by a ratio of the message rate of each respective higher priority virtual link to the message rate of the given virtual link;
compute a second sum of individual message times for the identified equal priority virtual links, wherein the respective message time of each equal priority virtual link is not multiplied by a factor regardless of the message rate of the respective equal priority virtual link;
wherein the queuing latency at the respective dispatch port is the sum of the first sum, the second sum, and a pre-determined message transmission time representing a maximum sized message, wherein the queuing latency at each node is one of a component delay of an end to end latency defined by slot times for each of the four traffic classes.

12. The program product of claim 10, wherein the program instructions are further configured to cause the at least one programmable processor to:
split a payload of a message corresponding to a given virtual link into a plurality of fragments, each fragment being smaller than a maximum frame size; and
send each of the plurality of fragments in a respective period of the given virtual link.

13. The program product of claim 10, wherein the program instructions are further configured to cause the at least one programmable processor to:
divide a payload of a message corresponding to a given virtual link that pertains to the first traffic class into a plurality of fragments, each fragment being smaller than a maximum frame size;
increase a slot time for the given virtual link to account for the plurality of fragments;
generate a plurality of schedule entries back-to-back on the global schedule based on the transmission time for the plurality of fragments.

14. The program product of claim 10, wherein the program instructions are further configured to cause the at least one programmable processor to:
calculate a respective variable slot time duration for each of the virtual links pertaining to the first traffic class and for each of the virtual links pertaining to the second traffic class.

15. The program product of claim 10, wherein the program instructions are further configured to cause the at least one programmable processor to:
calculate a green zone for each respective virtual link pertaining to the first traffic class based on timing information for the respective virtual link's producing host and consuming hosts, wherein the green zone specifics a valid time on the global schedule within which the respective virtual link is to be scheduled;
ensuring that virtual link end to end latency fits within the calculated green zone.

16. The program product of claim 10, wherein the program instructions are further configured to cause the at least one programmable processor to:
enable a reserve media option for one or more of the virtual links pertaining to the first traffic class, wherein the reserve media option block transmission of unscheduled frames for a predetermined period of time prior to a respective scheduled dispatch of the one or more virtual links pertaining to the first traffic class.

17. The program product of claim 10, wherein the program instructions are further configured to cause the at least one programmable processor to:
sort the virtual links pertaining to the second traffic class based on one or more attributes;
divide the sorted virtual links pertaining to the second traffic class into approximately equal sized groups based on the number of priorities available for the virtual links pertaining to the second traffic class; and
assign each group of virtual links to one of the priorities available for the virtual links pertaining to the second traffic class.

18. A method of scheduling communications, the method comprising:
scheduling transmission of virtual links pertaining to a first traffic class on a global schedule to coordinate transmission of the virtual links pertaining to the first traffic class across all transmitting end stations on the global schedule; and
scheduling transmission of each virtual link pertaining to a second traffic class on a local schedule of a respective transmitting end station in the transmitting end stations from which each respective virtual link pertaining to the second traffic class is transmitted such that transmission of each virtual link pertaining to the second traffic class is coordinated only at the respective end station from which the each respective virtual link pertaining to the second traffic class is transmitted, wherein a traffic class is defined by local versus global scheduling time requirements, delay and latency guarantee requirements, and synchronization control traffic constraints;
wherein the scheduling transmission of virtual links pertaining to the first traffic class comprises calculating a respective variable slot time duration for each of the virtual links pertaining to the first traffic class and for each of the virtual links pertaining to the second traffic class; and
wherein the scheduling transmission of each virtual link pertaining to the second traffic class comprises:
sorting the virtual links pertaining to the second traffic class based on one or more attributes;
dividing the sorted virtual links pertaining to the second traffic class into approximately equal sized groups based on the number of priorities available for the virtual links pertaining to the second traffic class; and
assigning each group of virtual links to one of the priorities available for the virtual links pertaining to the second traffic class.

19. The method of claim 18, further comprising:
account for the transmission of each virtual link pertaining to a third traffic class, wherein dispatch times from the end stations are not scheduled but whose latency is guaranteed and a fourth traffic class wherein the dispatch times from the end systems are not scheduled and whose latency is not guaranteed;
computing a queuing latency for a given virtual link at each respective dispatch port along a routing path for the given virtual link, wherein computing the queuing latency at each respective dispatch port comprises:
identifying all virtual links having a higher priority than the given virtual link and that are routed through the same respective dispatch port as the given virtual link;
identifying all virtual links having equal priority to the given virtual link and that are routed through the same respective dispatch port as the given virtual link;
computing a first sum of individual message times for the identified higher priority virtual links, wherein a respective message time of each identified higher priority virtual link is multiplied by a factor indicated by a ratio of the message rate of each respective higher priority virtual link to the message rate of the given virtual link;
computing a second sum of individual message times for the identified equal priority virtual links, wherein the respective message time of each equal priority virtual link is not multiplied by a factor regardless of the message rate of the respective equal priority virtual link;
wherein the queuing latency at the respective dispatch port is the sum of the first sum, the second sum, and a pre-determined message transmission time representing a maximum sized message, wherein the queuing latency at each node is one of a component delay of an end to end latency defined by slot times for each of the four traffic classes.

20. The method of claim 18, further comprising:
splitting a payload of a message corresponding to a given virtual link into a plurality of fragments, each fragment being smaller than a maximum frame size; and
sending each of the plurality of fragments in a respective period of the given virtual link.

* * * * *